United States Patent
Lejeune et al.

(10) Patent No.: US 7,595,372 B2
(45) Date of Patent: *Sep. 29, 2009

(54) EPOXY SILANE OLIGOMER AND COATING COMPOSITION CONTAINING SAME

(75) Inventors: Alain Lejeune, Reignier (FR); Yves Gentil, Carnves-Sales (FR)

(73) Assignee: Momentive Performance Materials Inc., Albany, NY (US)

( * ) Notice: Subject to any disclaimer, the term of this patent is extended or adjusted under 35 U.S.C. 154(b) by 221 days.

This patent is subject to a terminal disclaimer.

(21) Appl. No.: 11/297,714

(22) Filed: Dec. 8, 2005

(65) Prior Publication Data

US 2006/0225612 A1 Oct. 12, 2006

Related U.S. Application Data

(63) Continuation-in-part of application No. 11/100,840, filed on Apr. 7, 2005.

(51) Int. Cl.
*C08G 77/18* (2006.01)

(52) U.S. Cl. ........................................ 528/12; 524/588

(58) Field of Classification Search .................... 528/12; 524/588

See application file for complete search history.

(56) References Cited

U.S. PATENT DOCUMENTS

| 5,366,768 | A | 11/1994 | Kasari et al. |
|---|---|---|---|
| 5,714,532 | A | 2/1998 | Osterholtz et al. |
| 6,221,938 | B1 | 4/2001 | Chen et al. |
| 6,258,914 | B1 | 7/2001 | Su et al. |
| 6,270,884 | B1 | 8/2001 | Guhde et al. |
| 6,391,999 | B1 | 5/2002 | Crivello |
| 6,656,607 | B1 | 12/2003 | Rouquier et al. |
| 2004/0070041 | A1* | 4/2004 | Obayashi et al. ............ 257/437 |

FOREIGN PATENT DOCUMENTS

EP  0 291 260 B1  11/1988

* cited by examiner

*Primary Examiner*—Kuo-Liang Peng
(74) *Attorney, Agent, or Firm*—Dominick G. Vicari

(57) ABSTRACT

A process for producing an epoxy silane oligomer including a reaction glycidoxy silane and/or cycloaliphatic epoxy silane having 2 or 3 alkoxy groups and, optionally, a copolymerizable silane other than glycidoxy and cycloaliphatic epoxy silane, with less than 1.5 equivalents of water in the presence of a catalyst, wherein said water is continuously fed during the reaction.

20 Claims, 7 Drawing Sheets

EPOXY SILANE OLIGOMER AND COATING COMPOSITION CONTAINING SAME

CROSS-REFERENCE TO RELATED APPLICATIONS

This application is a continuation-in-part of copending U.S. patent application Ser. No. 11/100,840, filed Apr. 7, 2005, the entire contents of which are incorporated by reference herein.

BACKGROUND OF THE INVENTION

There is extensive literature describing the use of monomeric epoxy functional silanes. Such silanes are used either alone or combined with appropriate polymers. However, one of the main difficulties in the use of monomeric epoxy silanes in water is their sensitivity to hydrolysis and condensation which is difficult to control. In addition, the stability of the epoxy functionalities when using the monomeric epoxy silanes in water is difficult to control because of the tendency of the epoxy functionalities to exhibit ring opening.

The use of pre-hydrolyzed and pre-condensed silanes is one answer to such concerns. A pre-hydrolyzed and condensed silane can be an oligomeric structure that has specific features like controlled molecular weight, usually good film formation capabilities and dispersion properties because the silane terminations are already partially or totally condensed, and faster curing rates. This aspect of the oligomers makes them attractive to the coatings industry as it broadens the field of applications and also helps to get faster application or formulation properties. However, the high molecular weight oligomers can condense further to larger siloxane networks, which result in the formation of structures that are difficult to make water-soluble.

For example, U.S. Pat. No. 6,391,999 discloses multi-functional epoxy siloxane oligomers for use in a solventless or solvent-based system. These multifunctional epoxy siloxane oligomers have high molecular weights and an insignificant amount of residual silane functional groups. Thus, it is very difficult to make the oligomers water-soluble.

Another disadvantage of the use of monomeric epoxy silanes is that they release a large amount of volatile organic compounds (VOCs) expressed as alcohol content introduced by the alkoxy functionalities.

A general trend of the industry is to decrease or eliminate the release of VOCs or hazardous air pollutants (HAPS). It is desirable to reduce the methanol content of any structure that could be involved in coatings, adhesives and sealant applications.

It is also desirable to prepare water-based coatings, which are resistant to chemicals as well as corrosion resistant based on metallic powders like aluminum, zinc, bronze and other metallic or organic pigments. Metallic pigments being sensitive to water, there is also a need to have superior protection of such metallic powders in water against a well-known mechanism called hydrogen evolution.

It is also desirable to design water-based coatings that have superior adhesion properties, mechanical or chemical resistances with outstanding weathering behaviors and that can be applied on a variety of substrates such as metallic or plastic substrates, cellulosic or natural substrates, concrete and any other material generally used in the coatings and adhesives & sealant industries.

Therefore, there is a need to produce a water-soluble epoxy silane oligomer that is useful in a waterborne system. There is also a need for an epoxy silane oligomer structure having epoxy functional groups to be used in waterborne systems for corrosion protection, zinc rich primers, shop primers, metallic pigment dispersions or other coating applications.

BRIEF DESCRIPTION OF THE INVENTION

In accordance with the present invention, a process for producing an epoxy silane oligomer is provided that comprises reacting glycidoxy silane and/or cycloaliphatic epoxy silane having 2 or 3 alkoxy groups and, optionally, a copolymerizable silane other than glycidoxy silane and cycloaliphatic epoxy silane, with less than 1.5 equivalents of water in the presence of a catalyst, wherein said water is continuously fed during the reaction.

Further in accordance with the present invention, a coating composition is provided which contains epoxy silane oligomer made by the aforesaid process.

Even further in accordance with the present invention, a waterborne composition is provided which comprises at least one epoxy silane oligomer, wherein the epoxy silane oligomer is produced by the reaction of glycidoxy silane and/or cycloaliphatic epoxy silane having 2 or 3 alkoxy group and, optionally, a copolymerizable silane other than glycidoxy silane and cycloaliphatic epoxy silane, with less than 1.5 equivalents of water in the presence of a catalyst, wherein said water is continuously fed during the reaction, and one or more optional ingredients selected from the group consisting of a surfactant, pH adjusting agent, co-solvent, monomeric silane, binder, crosslinker and pigment paste dispersion.

A process for producing a waterborne coating composition in accordance with the present invention is also provided which comprises pre-solubilizing at least one epoxy silane oligomer in an aqueous solution under acidic conditions with one or more optional ingredients selected from the group consisting of pH adjusting agent, co-solvent, surfactant and monomeric silane, wherein the epoxy silane oligomer is produced by reacting glycidoxy silane and/or cycloaliphatic epoxy silane having 2 or 3 alkoxy group and, optionally, a copolymerizable silane other than glycidoxy silane and cycloaliphatic epoxy silane, with less than 1.5 equivalents of water in the presence of a catalyst, wherein said water is continuously fed during the reaction, and dispersing a particulate metal in the aqueous solution.

Unlike epoxy silane oligomers described in U.S. Pat. No. 6,391,999 which are not readily water soluble, the epoxy silane oligomers made by the process of the invention exhibit good water solubility making them particularly useful as components of water-based and waterborne coatings.

Various other features, aspects, and advantages of the present invention will become more apparent with reference to the following description and appended claims.

DETAILED DESCRIPTION OF THE INVENTION

Figure 1:
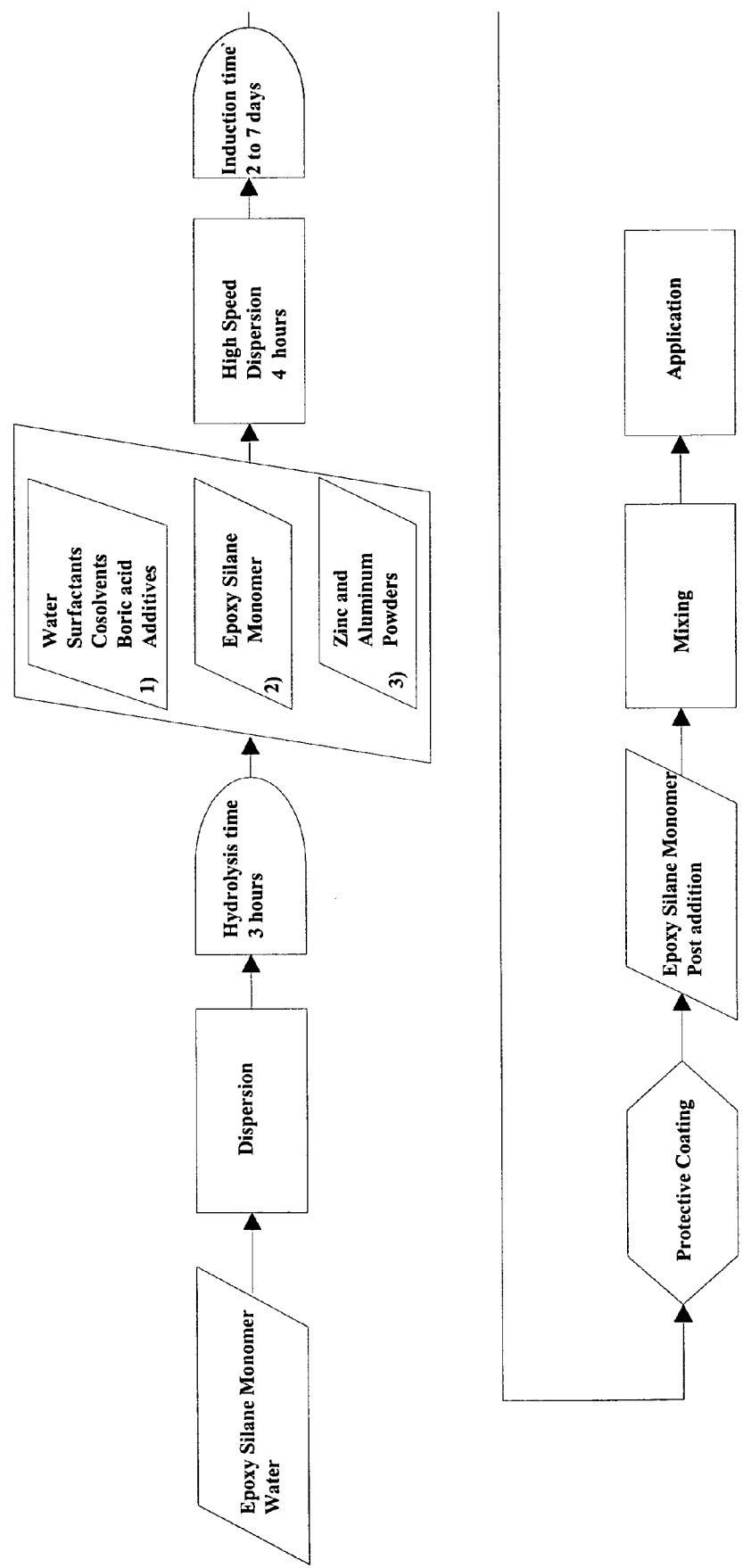
FIG. 1 is a flow diagram describing a process for forming paint in accordance with the prior art.

Epoxy silane oligomer synthesized with glycidoxy silane and/or cycloaliphatic epoxy silane having 2 or 3 alkoxy groups, optionally, with a copolymerizable silane other than glycidoxy silane and cycloaliphatic epoxy silane, with less than 1.5 equivalents of water in the presence of a catalyst, wherein said water is continuously fed during the reaction.

According to an embodiment of the present invention, an epoxy silane oligomer is synthesized using controlled hydrolysis and condensation of an epoxy silane monomer with continuous water introduction and a strong cationic exchange resin as a catalyst. The epoxy silane monomer may be either a glycidoxy or cycloaliphatic epoxy silane having 2 or 3 functional alkoxy groups.

According to another embodiment of the present invention, the epoxy silane monomers may be based on glycidoxy epoxy silanes or cycloaliphatic epoxysilanes in combination with other monomeric silanes that can provide specific organofunctional features like vinyl, methacryl, alkyl, polyalkyleneoxide and others with the proviso that they don't interact with epoxy functionalities.

According to another embodiment of the present invention, the epoxy silane monomer is combined with a polyalkyleneoxide functional silane, the latter improving the water solubility and the stability of the oligomer of the two silanes. Other monomeric silanes, as referenced in U.S. Pat. Nos. 3,337,496, 3,341,469 and 5,073,195 which are incorporated herein by reference, can be added to improve the solubility and stability of epoxy silane oligomers.

According to another embodiment of the present invention, the glycidoxy silane can be one or more of gamma-glycidoxypropyl trimethoxysilane, gamma-glycidoxypropyl triethoxysilane, gamma-glycidoxypropyl methyldimethoxysilane, gamma-glycidoxypropyl methyldiethoxysilane and the like.

According to another embodiment of the present invention, the cycloaliphatic expoxy silane can be one or more of beta-(3,4-expoxycyclohexyl)-ethyl trimethoxysilane, beta-(3,4-expoxycyclohexyl)-ethyl methyl dimethoxysilane, beta-(3,4-expoxycyclohexyl)-ethyl methyl diethoxysilane, beta-(3,4-epoxycyclohexyl)-ethyl triethoxysilane and the like.

The catalyst can be an ion exchange resin such as Purolite® CT-175 or CT 275 available from Plurolite, Amberlite® IRA 400, 402, 904, 910 or 966 available from Rohm & Haas, Lewatit® M-500, M-504, M-600, M-500-A, M-500 or K-2641, available from Bayer, Dowex® SBR, SBR-P, SAR, MSA-1 or MSA 2, available from Dow, or DIAON® SA10, SA12, SA 20A, PA-302, PA-312, PA-412 or PA-308, available from Mitsubishi. The catalyst can also be an alkylammonium salt such as hexadecyltrimethylammonium chloride, tetra-n-butylammonium chloride, or benzyl trimethyl ammonium chloride or bromide or the hydroxide form of these alkylammonium salts either alone or in combination with the halide salts. Also useful as catalysts are the reaction products of quaternary ammonium organofunctional silanes and supports such as ceramic (inclusive of glass), silica gel, precipitated or fumed silica, alumina, aluminosilicate, etc.

According to another embodiment of the present invention, the molar ratio of water to silane monomer(s) is from about 0.1 to about 1.5. According to yet another embodiment of the present invention, the molar ratio of water to silane monomer(s) is from about 0.4 to about 1.0. According to still yet another embodiment of the present invention, the molar ratio of water to silane monomer(s) is less than about 0.5.

According to another embodiment of the present invention, the epoxy silane oligomer (ESO) is synthesized in the presence of an alcohol-free, chemically stable solvent, e.g., an aliphatic hydrocarbon, a paraffin such as naphtha or mineral spirits, an aromatic hydrocarbon such as toluene, xylene or higher boiling homolog thereof; a ketone such as acetone, methyl ethyl ketone, methyl iso-butyl ketone, amyl ketone, an ester such as ethyl, n-propyl, n-butyl or amyl acetate, and the like.

In another embodiment of the present invention, by-product alcohol is continuously removed during the reaction.

According to yet another embodiment of the present invention, a waterborne coating composition is provided which comprises a particulate metal; a surfactant; an epoxy silane oligomer produced in accordance with the invention; and, one or more optional ingredients selected from the group consisting of pH adjusting agent, co-solvent and epoxy silane monomer.

According to another embodiment of the present invention, the waterborne coating composition includes the particulate metal in an amount of from about 0.1 to about 80 weight percent, the surfactant in an amount of from about 0.05 to about 10 weight percent, the epoxy silane oligomer in an amount of from about 0.1 to about 30 weight percent, water in an amount of from about 5 to about 99 weight percent, optional pH adjusting agent, where present, in an amount sufficient to provide a pH of from about 4 to about 6, optional co-solvent, where present, in an amount of from about 0.1 to about 60 weight percent, and optional silane monomer, where present, in an amount of up to about 10 weight percent.

For the purpose of aiding the dispersing of the ESO which is made in accordance with the process of the present invention in a waterborne system, a pH-adjusting agent is added during the dispersion of the ESOs in a waterborne system. The pH may be adjusted between 4 to 6. The pH-adjusting agent may be boric acid. According to another embodiment of the present invention, the pH adjusting agent is orthophosphoric acid, acetic acid or citric acid or any other acids that would have no detrimental effects to corrosion protection, e.g., carboxylic acids.

According to another embodiment of the present invention, co-solvents are added during the dispersion of the ESO in a waterborne system. The co-solvent may be dipropylene glycol methyl ether (e.g., Dowanol® DPM available from Dow Chemical) or other glycol ethers as well as alcohols.

According to another embodiment of the present invention, a combination of the pH adjusting agent and co-solvent is added during the dispersion of the ESO in the formulation of a waterborne system.

According to another embodiment of the present invention, a surfactant is added during the dispersion of the ESO in a waterborne system. The surfactant may be either an alkylphenol-ethoxylate (APEO) surfactant or an APEO free surfactant. According to another embodiment of the present invention, the surfactant is a cationic, anionic or non-ionic surfactant, or a polyether siloxane-based surfactant or any combination thereof. According to yet another embodiment of the present invention, a surfactant having a hydrophilic-lipophilic balance (HLB) of 13 is used. According to another embodiment of the present invention, the surfactant can be a package of several surfactants with different HLB values ranging from about 5 to about 15 or a package of non-ionic surfactant including a siloxane surfactant. According to another embodiment of the present invention, the surfactant can be selected from the group consisting of alkyl-phenol-ethoxylate surfactant, cationic surfactant, anionic surfactant, non-ionic surfactant, a polyether siloxane-based surfactant and any combination thereof. Specific examples of the surfactants include ethoxylated alcohols, ethoxylated sorbitan esters, ethoxylated fatty acids, ethoxylated fatty esters, fatty esters, alkylsulfosuccinates, dialkylsulfosuccinates, alkylethersulfates, alkylphosphate esters, sugar lipids, alkyl glucosides, amine ethoxylates, alkylphenol ether sulphates, amide ethoxylates and any combination thereof.

According to another embodiment of the present invention, the ESOs are used in water borne zinc rich primers or protective coating systems, metallic pigment paste dispersions, a blend of metallic paste dispersion with waterborne latexes or dispersions for primers, coatings or inks, waterborne protective coatings, waterborne shop primers, metallic pigment dispersions and their use in printing ink or coatings, cross linkers of waterborne latexes and dispersions including but not limited to anionic and cationic dispersions, acrylic styrene acrylic, polyurethane and epoxy dispersions, vinyl resins, adhesion promoters for same systems described above, additive or binder systems for dispersion of metallic fillers and pigments, pigment dispersion for inorganic fillers such as calcium carbonate, kaolin, clay, etc., waterborne protective coatings using zinc and other metallic pigments as sacrificial pigment, waterborne decorative paints for metal, plastics and other substrates.

According to another embodiment of the present invention, a waterborne coating composition is provided that includes water in an amount from about 5 to about 99 weight percent of the solvent content, a particulate metal, a surfactant and an aqueous medium including an epoxy silane oligomer and water, wherein the epoxy silane oligomer is produced by reacting either a glycidoxy or cycloaliphatic epoxy silane having 2 or 3 alkoxy groups with less than 1.5 equivalents of water in the presence of a catalyst resin, wherein the water is continuously fed during the reaction, and separating the catalyst resin from the epoxy silane oligomer.

The waterborne coating may also include an epoxy silane monomer and/or an additional epoxy silane oligomer. The additional epoxy silane monomer may be gamma-glycidoxypropyl trimethoxysilane, gamma-glycidoxypropyl triethoxysilane, gamma-glycidoxypropyl methyldimethoxysilane and a gamma-glycidoxypropyl methyldiethoxysilane. The additional epoxy silane oligomer may be the same as the epoxy silane oligomer used at the dispersion stage or an ESO formed from a different starting epoxy silane monomer or water to silane ratio.

In addition to an epoxy silane oligomer produced in accordance with the present invention and a monomeric epoxy silane, the waterborne coating composition may include an epoxy silane monomer and/or a non-epoxy based monomeric silane such as a vinyl silane, an alkyl silane or an alkylene silane. Typical non-epoxy based monomeric silanes maybe vinyltrimethoxysilane (e.g., Silquest® A-171 available from GE Silicones), vinyltriethoxysilane (e.g., Silquest® A-151 available from GE Silicones), vinylmethyldimethoxysilane (e.g., Silquest® A-2171 available from GE Silicones), vinyltriisopropoxysilane (e.g., CoatOSil® 1706 available from GE Silicones), n-octyltriethoxy silane (e.g., Silquest® A-137 available from GE Silicones), propyltriethoxy silane (e.g., Silquest® A-138 available from GE Silicones), propyltrimethoxysilane, methyltrimethoxysilane (e.g., Silquest®) A-1630 available from GE Silicones), methyltriethoxysilane (e.g., Silquest® A-162 available from GE Silicones), polyalkyleneoxidetrimethoxysilane (e.g., Silquest® A-1230 available from GE Silicones), 3-methacryloxypropyltrimethoxy silane (e.g., Silquest® A-174 available from GE Silicones), 3-methacryloxypropyltriethoxy silane (e.g., Silquest® Y-9936 available from GE Silicones) or 3-methacryloxypropyltriisopropoxy silane (e.g., CoatOSil® 1757 available from GE Silicones).

The aqueous medium of the waterborne coating may include a pH agent. The pH-adjusting agent may be, but is not limited to, boric acid, orthophosphoric acid, acetic acid, glycolic, malic acid, citric acid or other carboxylic acids. In addition, according to an embodiment of the present invention, the pH-adjusting agent is present in an amount ranging of from about 0.5 to about 4.0 weight percent of the aqueous medium.

The aqueous medium of the waterborne coating may include a co-solvent. The co-solvent may be dipropylene glycol methyl ether. Other solvents may include one or combinations of glycol ether solvents or the like. According to another embodiment, the co-solvent is ethylene glycol monomethyl ether (EGME), ethylene glycol monoethyl ether (EGEE), ethylene glycol monopropyl ether (EGPE), ethylene glycol monobutyl ether (EGBE), ethylene glycol monomethyl ether acetate (EGMEA), ethylene glycol monohexyl ether (EGHE), ethylene glycol mono-2-ethylhexyl ether (EGEEHE), ethylene glycol monophenyl ether (EGPhE), diethylene glycol monomethyl ether (diEGME), diethylene glycol monoethyl ether (diEGEE), diethylene glycol monopropyl ether (diEGPE), diethylene glycol monobutyl ether (diEGBE), butyl carbitol, dipropylene glycol dimethyl ether (diEGME), butyl glycol, butyldiglycol or ester-based solvents. According to another embodiment, the ester-based solvents include ethylene glycol monobutyl ether acetate (EGEEA), diethylene glycol monoethyl ether acetate (diEGEEA), diethylene glycol monobutyl ether acetate (diEGBEA), n-propyl acetate, n-butyl acetate, isobutyl acetate, methoxypropylacetate, butyl cellosolve actetate, butylcarbitol acetate, propylene glycol n-butyl ether acetate, t-Butyl acetate or an alcohol-based solvent. According to yet another embodiment, the alcohol-based solvent may be n-butanol, n-propanol, isopropanol or ethanol.

According to another embodiment of the present invention, the co-solvent is present in an amount ranging of from about 0.1 to about 60 weight percent of the aqueous medium.

According to another embodiment of the present invention, the aqueous medium includes an epoxy silane monomer. The epoxy silane monomer may be gamma-glycidoxypropyl trimethoxysilane, gamma-glycidoxypropyl triethoxysilane, gamma-glycidoxypropyl methyldimethoxysilane or gamma-glycidoxypropyl methyldiethoxysilane.

The aqueous medium of the waterborne coating may include a surfactant. The surfactant may be an alkyl-phenol-ethoxylate surfactant, a cationic surfactant, anionic surfactant, a non-ionic surfactant, or a polyether siloxane based surfactant or any combination thereof. According to an embodiment of the present invention, the surfactant has a hydrophilic-lipophilic balance (HLB) ranging from about 5 to about 13. According to another embodiment of the present invention, the aqueous medium includes two or more surfactants, wherein each of the surfactants independently has an HLB value ranging from about 5 to about 15. In addition, the surfactant may be present in an amount ranging of from about 3 to about 6 weight percent of the aqueous medium. According to yet another embodiment of the present invention, the aqueous medium of the waterborne coating includes a surfactant and a pH-adjusting agent.

The particulate metal of the coating composition may, in general, be any metallic pigment such as finely divided aluminum, manganese, cadmium, nickel, stainless steel, tin, magnesium, zinc, alloys thereof, or ferroalloys. According to another embodiment of the present invention, the particulate metal is zinc dust or zinc flake or aluminum dust or aluminum flake in a powder or paste dispersion form. The particulate metal may be a mixture of any of the foregoing, as well as comprise alloys and intermetallic mixtures thereof. Flake may be blended with pulverulent metal powder, but typically with only minor amounts of powder. The metallic powders typically have particle size such that all particles pass 100 mesh and a major amount pass 325 mesh ("mesh" as used herein is U.S. Standard Sieve Series). The powders are generally spherical as opposed to the leafing characteristic of the flake.

According to another embodiment of the present invention, the metal particulate is a combination of aluminum and zinc. Where the metal particulate is the combination of zinc with aluminum, the aluminum may be present in very minor amount, e.g., from as little as about 2 to about 5 weight percent, of the particulate metal, and still provide a coating of bright appearance. Usually the aluminum will contribute at least about 10 weight percent of the particulate metal. Thus, frequently, the weight ratio of aluminum to zinc in such a combination is at least about 1:9. On the other hand, for economy, the aluminum will advantageously not contribute more than about 50 weight percent of the zinc and aluminum total, so that the aluminum to zinc weight ratio can reach 1:1. The particulate metal content of the coating composition will not exceed more than about 35 weight percent of the total composition weight to maintain best coating appearance, but will usually contribute at least about 10 weight percent to consistently achieve a desirable bright coating appearance. Advantageously, where aluminum is present, and especially where it is present without other particulate metal, the aluminum will provide from about 1.5 to about 35 weight percent of the total composition weight. Typically, when particulate zinc is present in the composition, it will provide from about 10 to about 35 weight percent of the total composition weight. The metal may contribute a minor amount of liquid, e.g., dipropylene glycol or mineral spirits. Particulate metals contributing liquid are usually utilized as pastes, and these pastes can be used directly with other composition ingredients. However, it is to be understood that the particulate metals may also be employed in dry form in the coating composition.

According to another embodiment of the present invention, the metal particulate can be a corrosion protection filler or pigment such as chromate containing anti corrosive pigments (e.g., zinc chromates and zinc potassium chromates), phosphate containing pigments (e.g., zinc phosphates, alumino triphosphates, calcium magnesium phosphates, barium phosphates, aluminum zinc phosphates, molybdates, wolframates, zirconates and vanadates), metal organic inhibitors like zinc salts of 5-nitrophtalic acid or conductive pigments like iron phosphide.

For the purpose of aiding the dispersion of the particulate metal, a dispersing agent may be added, i.e., surfactant, serving as a "wetting agent" or "wetter", as such terms are used herein. Suitable wetting agents or mixture of wetting agents include nonionic agents such as the nonionic alkylphenol polyethoxy adducts, for example. Also, anionic wetting agents can be employed, and these are most advantageously controlled foam anionic wetting agents. These wetting agents or mixture of wetting agents can include anionic agents such as organic phosphate esters, as well as the diester sulfosuccinates as represented by sodium bistridecyl sulfosuccinate. The amount of such wetting agent is typically present in an amount from about 0.01 to about 3 weight percent of the total coating composition.

It is contemplated that the composition may contain a pH modifier, which is able to adjust the pH of the final composition. Usually, the composition, without pH modifier, will be at a pH within the range of from about 6 to about 7.5. It will be understood that as the coating composition is produced, particularly at one or more stages where the composition has some, but less than all, of the ingredients, the pH at a particular stage may be below 6. However, when the complete coating composition is produced, and especially after it is aged, which aging will be discussed herein below, then the composition will achieve the requisite pH. Where a modifier is used, the pH modifier is generally selected from the oxides and hydroxides of alkali metals, with lithium and sodium as the preferred alkali metals for enhanced coating integrity; or, it is selected from the oxides and hydroxides usually of the metals belonging to the Groups IIA and IIB in the Periodic Table, which compounds are soluble in aqueous solution, such as compounds of strontium, calcium, barium, magnesium, zinc and cadmium. The pH modifier may also be another compound, e.g., a carbonate or nitrate, of the foregoing metals.

According to another embodiment of the present invention, the coating composition may contain what is usually referred to herein as a "boric acid component", or "boron-containing compound". For the "component" or for the "compound", as the terms are used herein, it is convenient to use orthoboric acid, commercially available as "boric acid", although it is also possible to use various products obtained by heating and dehydrating orthoboric acid, such as metaboric acid, tetraboric acid and boron oxide.

The coating composition may also contain thickener. It had previously been considered that thickener was an important ingredient, as discussed in U.S. Pat. No. 5,868,819. It has, however, now been found that serviceable coating compositions can be produced which do not contain a thickener, and desirable coating composition characteristics such as storage stability can nevertheless be achieved. For the present invention, the thickener is thus an optional substituent. The thickener, when present, can contribute an amount of between about 0.01 to about 2.0 weight percent of the total composition weight. This thickener can be a water soluble cellulose ether, including the "Cellosize" (trademark) thickeners. Suitable thickeners include the ethers of hydroxyethylcellulose, methylcellulose, methylhydroxypropylcellulose, ethylhydroxyethylcellulose, methylethylcellulose or mixtures of these substances. Although the cellulose ether needs to be water soluble to augment thickening of the coating composition, it need not be soluble in the organic liquid. When thickener is present, less than about 0.02 weight percent of the thickener will be insufficient for imparting advantageous composition thickness, while greater than about 2 weight percent of thickener in the composition can lead to elevated viscosities which provide compositions that are difficult to work with. According to an embodiment of the present invention, for thickening without deleterious elevated viscosity, the total composition will contain from about 0.1 to about 1.2 weight percent of thickener. It will be understood that although the use of a cellulosic thickener is contemplated, and thus the thickener may be referred to herein as cellulosic thickener, some to all of the thickener may be another thickener ingredient. Such other thickening agents include xanthan gum, associative thickeners, such as the urethane associative thickeners and urethane-free nonionic associative thickeners, which are typically opaque, high-boiling liquids, e.g., boiling above 100° C. Other suitable thickeners include modified clays such as highly beneficiated hectorite clay and organically modified and activated smectite clay. When thickener is used, it is usually the last ingredient added to the formulation.

The coating composition may contain further additional ingredients in addition to those already enumerated hereinabove. These other ingredients may include phosphates. It is to be understood that phosphorous-containing substituents, even in slightly soluble or insoluble form, may be present, e.g., as a pigment such as ferrophos. The additional ingredients will frequently be substances that can include inorganic salts, often employed in the metal coating art for imparting some corrosion-resistance or enhancement in corrosion-resistance. Materials include calcium nitrate, dibasic ammonium phosphate, calcium sulfonate, 1-nitropropane lithium carbonate (also useful as a pH modifier), or the like, and, if used, these are most usually employed in the coating composition in a total combined amount of from about 0.1 to about 2 weight percent. Greater than about 2 weight percent of such additional ingredient may be utilized where it is present for a combination of uses, such as lithium carbonate used as a corrosion-inhibitor and also as a pH adjusting agent. Most usually the coating composition is free from these further additional ingredients.

In an other embodiment of the present invention, the formulation may include, when necessary, a surface active agent for reducing foam or aiding in de-aeration. The de-foamer and de-aerator agent may include mineral oil based material, silicone-based material, a polyether siloxane or any combination thereof. The concentration of the surface active agents can be adjusted to in the range from about 0.01% to about 5% of active material. The surface active agents may be used as a pure material or as a dispersion in water or any other appropriate solvent to disperse them into the final waterborne composition.

The coating composition may also contain surface effect agents for modifying a surface of the coating composition such as increased mar resistance, reduced coefficient of friction, flatting effects, improved abrasion resistance. Examples may include silicone polyether copolymers such as e.g., Silwet® L-7608 and other variants available from GE Silicones.

Typical crosslinkers can also be utilized in the coating composition of the present invention. For example, the crosslinker can be isocyanates, epoxy curing agents, amino agents, aminoamido agents, epoxy amino adducts, carbodiimides, melamines anhydrides, polycarboxylic anhydrides, carboxylic acid resins, aziridines, titanates, organofunctional titanates, organofunctional silanes, etc.

The additives discussed above can be added at any stage of the use of an ESO produced in accordance with the present or in any of the different steps of the production of a waterborne composition produced in accordance with the present invention.

The coating formulation may also contain corrosion inhibitors. Examples of inhibitors may include chromate, nitrite and nitrate, phosphate, tungstate and molybdate, or organic inhibitors include sodium benzoate or ethanolamine.

According to another embodiment of the present invention, the formulations discussed herein using an ESO of the present invention may be chrome-free. According to another embodiment of the present invention, it may be desirable to prepare a chrome-containing formulation using an ESO of the present invention. Such chrome-containing anti-corrosion pigments are for example zinc chromates like zinc potassium chromates and zinc tetrahydroxychromates. Other anti-corrosive pigments may include molybdates, wolframates, zirconates, vanadates, zinc phosphates, chromium phosphates, aluminum triphosphates, barium phosphates, and aluminum zinc phosphates. Such anti-corrosive pigments may also be combined with an organic corrosion inhibitor like zinc salt, e.g., 5-nitrophtalic acid.

Alternatively, a waterborne composition of the present invention is provided which comprises a dispersion of a particulate metal in an aqueous solution including at least one epoxy silane oligomer as described herein above with one or more optional ingredients selected from the group consisting of a surfactant, pH adjusting agent, co-solvent, monomeric silane, binder, and any other ingredients typically employed in coatings, e.g., thickeners, crosslinkers, etc.

The binder can be an inorganic and organic binders. The inorganic binder can be a silicate, ethyl silicate, silica nano particles solution or silicone resin.

The organic binder can be vinylic resins, polyvinyl chlorides, vinyl chloride copolymers, vinylacetate copolymers, vinylacetates copolymers, acrylics copolymers, styrene butadiene copolymers, acrylate, acrylate copolymer, polyacrylate, styrene acrylate copolymers, phenolic resins, melamine resins, epoxy resins, polyurethane resins, alkyd resins, polyvinyl butyral resins, polyamides, polyamidoamines resins, polyvinyl ethers, polybutadienes, polyester resins, organosilicone resin, organopolysiloxane resin and any combinations thereof. Natural binders such as cellulosic derivatives like nitrocellulosic resins, carboxymethyl cellulose, cellulose esters of organic acids, cellulose ethers like hydroxymethyl or ethyl cellulose, modified natural rubbers, natural gums or solution forms of said polymers and copolymers.

The organic binders can also be a non-ionic stabilized resins, an anionic stabilized emulsion or a cationic stabilized emulsion.

The coating composition can be formulated in a variety of procedures. For example, as an alternative to directly using the ESO, in accordance with the present invention above, the ESO may used as a binding agent in a concentrated form or as a more dilute premixture of the ESO, such as the ESO is mixed with a diluent. The diluent may be selected from the substituents providing the coating composition liquid medium, such as water, or water plus boric acid component, or water plus low-boiling organic liquid including acetone. Additionally, it is contemplated that the ESO binding agent may initially be mixed together with any of the other necessary composition ingredients. Hence, the ESO in a liquid form, such as in a diluent, may be mixed with other coating composition ingredients which are in solid or liquid form. However, it will most always be present in any composition before a particulate metal is added to that composition.

In addition, the ESOs, in accordance with the present invention discussed above, may be incorporated in many different formulations having many different uses such as those described in U.S. Pat. Nos. 6,270,884 and 6,656,607, which are incorporated herein by reference in their entirety. For instance, in accordance with an exemplary embodiment of the present invention, a waterborne composition is provided which comprises at least one epoxy silane oligomer made in accordance with present invention describe above herein with one or more optional ingredients selected from the group consisting of a surfactant, pH adjusting agent, co-solvent, monomeric silane, binder, crosslinker and pigment paste dispersion. The epoxy silane oligomer, in a first embodiment, can be present in the range of about 0.05 to about 40 weight percent of the composition, in a second embodiment in the range of about 0.1 to about 20 weight percent of the composition, in a third embodiment in the range of about 0.1 to about 10 weight percent of the composition, in a fourth embodiment in the range of about 0.5 to about 10 weight percent of the composition.

Packaging concepts, as well as formulation considerations for how the coating composition is prepared, can be taken into consideration when bringing composition ingredients together. Thus, it is contemplated that less than all of the coating composition ingredients may be present in other composition premixtures. Such can include, for example, a wetting agent, or a wetting agent plus a boric acid component, or an aqueous medium plus a boric acid component. Such premixtures may be made up with liquid which may or may not include the aqueous medium, and may or may not include an organic liquid.

Even considering storage stability, the composition may be a one-pack formulation of all coating composition ingredients or a two-pack formulation. It will be understood that the final coating composition, as well as separate pre-blended packages, may be prepared in concentrated form.

Where particulate aluminum will be used in the coating composition, and especially where both particulate zinc and particulate aluminum will be employed, a variant of the above packaging considerations may be utilized. According to another embodiment of the present invention, it is desirable to use a zinc and aluminum combination and to start with a mixture, susceptible to packaging, of about 0.1 to 15 percent wetting agent, about 0.1 to 5 percent boric acid component, about 0.5 to 35 percent silane binding agent and a balance of aqueous medium to provide 100 weight percent total mixture weight. Into this mixture, there then can be dispersed particulate metal, usually as a flake, e.g., zinc flake. Additional aqueous medium may be added, whereby the resulting metal-containing dispersion can contain about 25 to about 45 weight percent of the particulate metal and from as much as about 40, up to about 60, weight percent aqueous medium, both basis the total weight of the resulting metal-containing dispersion.

Typically, there is then separately prepared an additional package precursor blend to introduce the particulate aluminum into the final coating composition. This particulate aluminum will generally be aluminum flake, but it is to be understood that other metals in flake form, e.g., zinc flake, may be present with the aluminum.

Even when made as a one-package formulation, the final coating composition has highly desirable storage stability. This confirms the binding ability of the ESOs, in accordance with the present invention, to protect the particulate metal from deleterious reaction with other composition ingredients during extended storage. Such extended shelf stability was unexpected, owing to the recognized reaction problems of particulate metal in water-reducible systems, e.g., hydrogen gas evolution from aqueous compositions containing particulate zinc. However, even after storage as a single package, compositions of the present invention can be unpackaged, prepared for coating application as by brisk stirring, then readily applied. Resulting coatings can have the desirable corrosion-resistance, and often the other coating characteristics, of coatings applied from freshly prepared compositions.

Where a bath of the coating composition has been prepared, it has been found desirable to age this blend. Aging can help provide better coating performance. Usually, aging of the blend will be for at least 1 hour, and advantageously for at least about 2 hours to about 7 days, or more. Aging for less than 1 hour can be insufficient for developing desirable bath characteristics, whereas aging for greater than 7 days can be uneconomical.

The final coating composition, whether freshly prepared or after storage, may be applied by various techniques, such as immersion techniques, including dip drain and dip spin procedures. Where parts are compatible with same, the coating can be applied by curtain coating, brush coating or roller coating and including combinations of the foregoing. It is also contemplated to use spray technique as well as combinations, e.g., spray and spin and spray and brush techniques. Coated articles that are at an elevated temperature may be coated, often without extensive cooling, by a procedure such as dip spin, dip drain or spray coat.

The protected substrate can be any substrate, e.g., a ceramic or similar substrate, but is most particularly a metal substrate such as a zinc or iron, e.g., steel, substrate, an important consideration being that any such substrate withstand the heat curing conditions for the coating. By a "zinc" substrate it is meant a substrate of zinc or zinc alloy, or a metal such as steel coated with zinc or zinc alloy, as well as a substrate containing zinc in intermetallic mixture. Likewise, the iron of the substrate can be in alloy or intermetallic mixture form. Especially where such are metal substrates, which are most usually ferrous substrates, these may be pretreated, e.g., by chromate or phosphate treatment, prior to application of the undercoating. Thus, the substrate may be pretreated to have, for example, an iron phosphate coating in an amount from about 50 to about 100 mg/ft$^2$ or a zinc phosphate coating in an amount from about 200 to about 2,000 mg/ft$^2$.

For the substrates containing applied coating composition, the subsequent curing of the composition on the substrate will usually be a hot air oven cure, although other curing procedures can be used, e.g., infrared baking and induction curing. The coating composition will be heat-cured at an elevated temperature, e.g., on the order of about 450° F., but usually greater, oven air temperature. The cure will typically provide a substrate temperature, usually as a peak metal temperature, of at least about 450° F. oven air temperatures may be more elevated, such as on the order of 650° F., but for economy, the substrate temperature need not exceed about 450° F. Curing, such as in a hot air convection oven, can be carried on for several minutes. Although cure times may be less than 5 minutes, they are more typically on the order of from about 10 to about 40 minutes. It is to be understood that cure times and temperatures can be effected where more than one coating is applied or where a subsequently applied, heat-cured topcoating will be used. Thus, shorter time and lower temperature cures can be employed when there will be applied one or more additional coatings or a topcoating that proceeds through an elevated temperature bake at a longer cure time. Also, where more than one coating is applied or a heat-curable topcoating will be applied, the first coating, or undercoating, may only need be dried, as discussed hereinabove. Then, curing can proceed after application of a second coating, or of a heat-cured topcoating.

The resulting weight of the coating on the metal substrate may vary to a considerable degree, but will always be present in an amount supplying greater than 500 mg/ft$^2$ of coating. A lesser amount will not lead to desirably enhanced corrosion-resistance. Advantageously, a coating of greater than about 1,000 mg/ft$^2$ of coated substrate will be present for best corrosion-resistance, while most typically between about 2,000 to 5,000 mg/ft$^2$ of coating will be present. In this coating, there will generally be present from about 400 mg/ft$^2$ to about 4,500 mg/ft$^2$ of particulate metal.

Before use, the coated substrate may be topcoated, e.g., with silica substance. The term "silica substance", as it is used herein for the topcoating, is intended to include both silicates and colloidal silicas. The colloidal silicas include both those that are solvent-based as well as aqueous systems, with the water-based colloidal silicas being most advantageous for economy. As is typical, such colloidal silicas can include additional ingredients, e.g., thickeners as, for example, up to about 5 weight percent of an above-discussed water-soluble cellulose ether. Also, a minor amount, e.g., 20 to 40 percent by weight and usually a lesser amount, of the colloidal silicas can be replaced by colloidal alumina. In general, the use of colloidal silicas will provide for heavier topcoats of silica substance over undercoated substrate materials. It is contemplated to use colloidal silicas containing up to 50 percent by weight solids, but typically, much more concentrated silicas will be diluted, for example, where spray application of the topcoat will be used.

When the topcoating silica substance is silicate, it may be organic or inorganic. The useful organic silicates include the alkyl silicates, e.g., ethyl, propyl, butyl and polyethyl silicates, as well as alkoxyl silicates such as ethylene glycol monoethyl silicate. Most generally for economy, the organic silicate is ethyl silicate. Advantageously, the inorganic silicates are used for best economy and corrosion-resistance performance. These are typically employed as aqueous solutions, but solvent-based dispersions may also be used. When used herein in reference to silicates, the term "solution" is meant to include true solutions and hydrosols. The preferred inorganic silicates are the aqueous silicates that are the water-soluble silicates, including sodium, potassium, lithium and sodium/lithium combinations, as well as other related combinations.

Other ingredients may be present in the silica substance topcoating composition, e.g., wetting agents and colorants, and the composition may contain chrome substituents if desired, but can be chrome-free as defined hereinabove to provide a totally chrome-free coating. Substances that may be present can further include thickening and dispersing agents as well as pH adjusting agents, but all such ingredients will typically not aggregate more than about 5 weight percent, and usually less, of the topcoating composition so as to provide for enhanced coating composition stability coupled with augmented coating integrity. The silica substance topcoating may be applied by any of the above described various techniques for use with the coating composition, such as immersion techniques including dip drain and dip spin procedures.

By any coating procedure, the topcoat should be present in an amount above about 50 mg/ft$^2$ of coated substrate. For economy, topcoat weights for cured topcoating will not exceed about 2,000 mg/ft$^2$ of coated substrate. This range is for the cured silica substance topcoating. Preferably, for best coating efficiency and silica substance topcoat economy, the topcoat is an inorganic silicate providing from about 200 to about 800 mg/ft$^2$ of cured silicate topcoating.

For the silica substance topcoat curing, it is typical to select the curing conditions in accordance with the particular silica substance used. For the colloidal silicas, air drying may be sufficient; but, for efficiency, elevated temperature curing is preferred for all the silica substances. The elevated temperature curing can be preceded by drying, such as air drying. Regardless of prior drying, a lower cure temperature, e.g., on the order of about 150° F. to about 300° F., will be useful for the colloidal silicas and organic silicates. For the inorganic silicates, curing typically takes place at a temperature on the order of about 300° F. to about 500° F. In general, cure temperatures on the order of from about 150° F. to about 800° F. or more, as peak metal temperatures, may be useful. At the more elevated temperatures, cure times may be as fast as about 10 minutes, although longer cure times, up to about 20 minutes, are more usual. Also, articles can be topcoated with the silica substance topcoat while the articles are at elevated temperature, as from the curing of the water-reducible coating composition. Such could be done as by spray coat or dip drain, i.e., a dipping of the elevated temperature article into the topcoat composition, which can provide a quenching of the article. Upon removal from the topcoating composition, the article can be drained. Some to all of the topcoat curing can be achieved by the operation.

Before use, the coated substrate with the coating from the water-reducible coating composition may also be further topcoated with any other suitable topcoating, i.e., a paint or primer, including electrocoating primers and weldable primers, such as the zinc-rich primers that may be typically applied before electrical-resistance welding. For example, it has already been shown in U.S. Pat. No. 3,671,331 that a primer topcoating containing a particulate, electrically conductive pigment, such as zinc, is highly serviceable for a metal substrate that is first coated with another coating composition. Other topcoating paints may contain pigment in a binder or can be unpigmented, e.g., generally cellulose lacquers, resin varnishes, and oleoresinous varnishes, as for example tung oil varnish. The paints can be solvent-reduced or they may be water-reduced, e.g., latex or water-soluble resins, including modified or soluble alkyds, or the paints can have reactive solvents such as in the polyesters or polyurethanes. Additional suitable paints which can be used include oil paints, including phenolic resin paints, solvent-reduced alkyds, epoxies, acrylics, vinyl, including polyvinyl butyral, and oil-wax-type coatings such as linseed oil-paraffin wax paints.

Of special interest, the coated substrate with the coating from the water-reducible coating composition can form a particularly suitable substrate for paint deposition by electrocoating. The electrodeposition of film-forming materials is well known and can include electrocoating of simply a film-forming material in a bath or such a bath which may contain one or more pigments, metallic particles, drying oils, dyes, extenders, and the like, and the bath may be a dispersion or ostensible solution and the like. Some of the well known resinous materials useful as film-forming materials include the polyester resins, alkyd resins, acrylate resins, hydrocarbon resins, and epoxy resins, and such materials can be reacted with other organic monomers and/or polymers including hydrocarbons such as ethylene glycol, monohydric alcohols, ethers, and ketones.

For this, it has also been taught, for example in U.S. Pat. No. 4,555,445, that suitable topcoating compositions may be pigmented dispersions or emulsions. These can include copolymer dispersions in liquid medium as well as aqueous emulsions and dispersions of suitable waxes. Articles can be topcoated in these compositions, which articles are at elevated temperature such as after curing of the applied water-reducible coating, by procedures including a dip-drain or a spray coating operation. By such quench coating operation, all of the topcoating curing may be achieved without further heating. Quench coating with polymeric solutions, emulsions and dispersions, and with heated baths, has also been discussed in U.S. Pat. No. 5,283,280.

Before coating, it is in most cases advisable to remove foreign matter from the substrate surface, as by thoroughly cleaning and degreasing. Degreasing may be accomplished with known agents, for instance, with agents containing sodium metasilicate, caustic soda, carbon tetrachloride, trichlorethylene, and the like. Commercial alkaline cleaning compositions which combine washing and mild abrasive treatments can be employed for cleaning, e.g., an aqueous trisodium phosphate-sodium hydroxide cleaning solution. In addition to cleaning, the substrate may undergo cleaning plus etching, or cleaning plus shot blasting.

Further, the organic and inorganic binders can be cured with an external crosslinker(s) such as isocyanates, epoxy curing agents, amino or aminoamido agents, epoxy amino adducts, carbodiimides, melamines anhydrides polycarboxylic anhydrides and carboxylic acid resins, aziridines, titanates, organofunctional titanates, organofunctional silanes such as epoxy silanes, aminosilanes, isocyanatosilanes, methacryl silanes, vinylsilanes.

The following examples are illustrative of the present invention and the results obtained by the test procedures. It is to be understood the examples are not intended, nor should they be construed, as being limiting upon the scope of the invention. A person skilled in the applicable arts will appreciate from these examples that this invention can be embodied in many different forms other than as is specifically disclosed.

EXAMPLE 1

Synthesis Procedures for the Preparation of Epoxy Silane Oligomer Examples 1-9

ESO Example 1 was prepared using the procedure outlined in U.S. Pat. No. 6,391,999.

ESO Examples 2 through 9 were prepared using the following procedures. A reactor was pre-charged with an epoxy silane and solvent. Then, a cationic exchange resin was introduced, and the total charge pre-heated to reflux. Next, water was introduced slowly, drop-by-drop, using a separate funnel at the reflux temperature. Introduction times were varied from 1 to 2 hours. Different reaction times at atmospheric pressure were applied, e.g., from 25 minutes to 2.5 hours. Distillation was ran immediately after the reaction time to remove the solvent using vacuum from atmospheric pressure down to −0.2 bars.

More particularly, a 2-liter reactor with a heating envelope was equipped with mechanical agitation, an introduction funnel and a water condenser for solvent reflux. The reactor was then charged with a silane of the type and quantity listed in Table 1, a solvent of the type and quantity listed in Table 1 and a catalyst resin of the type and quantity as listed in Table 1.

The mixture was then heated to reflux, to a temperature ranging of from about 70 to about 73° C. The separation introduction funnel was charged with distilled water of the quantity listed in Table 1. Next, water was introduced drop by drop while stirring with the mechanical agitator for different times (See Table 1).

After complete water introduction, the reaction was left for different post reaction times (See Table 1). Next, the condenser was set up as a distillation condenser and equipped with a round flask collector. Solvents were extracted either at atmospheric pressure or under vacuum for appropriate times so that all solvents were evaporated at reactor temperature and final vacuum of −0.2 bars. The reactor was allowed to cool to room temperature before the product was extracted and filtered through filter paper followed by a sintered glass filter number 3. The descriptions and amounts of each example are listed in Table 1.

TABLE 1

| ESO Example Number | | ESO Example 1 | ESO Example 2 | ESO Example 3 | ESO Example 4 | ESO Example 5 | ESO Example 6 |
|---|---|---|---|---|---|---|---|
| Silane | Type | Gamma-glycidoxypropyl trimethoxysilane (Silquest ® A-187 available from GE Silicones) | Gamma-glycidoxypropyl trimethoxysilane (Silquest ® A-187 available from GE Silicones) | Gamma-glycidoxypropyl trimethoxysilane (Silquest ® A-187 available from GE Silicones) | Gamma-glycidoxypropyl trimethoxysilane (Silquest ® A-187 available from GE Silicones) | Gamma-glycidoxypropyl trimethoxysilane (Silquest ® A-187 available from GE Silicones) | Gamma-glycidoxypropyl trimethoxysilane (Silquest ® A-187 available from GE Silicones) |
| | Weights (grams) | 246.4 | 739.2 | 739.2 | 1418.4 | 1478.4 | 1478.4 |
| | Moles | 1.04 | 3.13 | 3.13 | 6.00 | 6.25 | 6.25 |
| Solvent | Type | Isopropyl Alcohol | Acetone | Acetone | Acetone | Acetone | Acetone |
| | Weight (grams) | 50 | 125 | 130 | 250 | 250 | 250 |
| Ion Exchange Resin (Amberlite ® IRA 402 CL available from Rohm and Haas) | Weight (grams) | 8 | 24 | 24 | 48 | 48 | 48 |
| Distilled Water | Weight (grams) | 27 | 27 | 54 | 108 | 54 | 54 |
| | Moles | 1.5 | 1.5 | 3 | 6 | 3 | 3 |
| Operations | Introduction Time (minutes) | 0 | 60 | 60 | 130 | 105 | 70 |
| | Post Reaction Time (minutes) | 300 | 150 | 60 | 25 | 45 | 80 |

TABLE 1-continued

|  |  |  |  |  |  |  |  |
|---|---|---|---|---|---|---|---|
|  | Distillation Time (minutes) | 30 | 120 | 210 | 65 | 20 | 20 |
|  | Total Reaction Time (minutes) | 330 | 330 | 330 | 220 | 170 | 170 |
| Water/Silane Characterization | Mole Ratio | 1.44 | 0.48 | 0.96 | 1.00 | 0.48 | 0.48 |
|  | Residual Monomer (wt. percent) | 15.9 | 23.5 | 12.5 | 16 | 22 | 15 |
|  | Epoxy content (wt. percent in the neat product) | 21.9 | 20.9 | 21.6 | 21.5 | 21.6 | 21.5 |
|  | Epoxy content (wt. percent in the oligomer portion) | 26.0 | 27.3 | 24.7 | 25.6 | 27.6 | 25.3 |
|  | Viscosity (mPa·s LV2-30) | 689 | 86 | 49 | 23 | 23 | 23 |
| Product Recovered | Weight (grams) | 131.3 | 630 | 614 | 1188 | 1267 | 1246 |
| Weight Loss | grams | n.a. | 109.2 | 125.2 | 230.4 | 211.4 | 232.4 |

| | ESO Example Number | ESO Example 7 | ESO Example 8 | ESO Example 9 |
|---|---|---|---|---|
| | Silane Type | Gamma-glycidoxypropyl triethoxy silane (Silquest ® A-15589 available from GE Silicones) | Gamma-glycidoxypropyl trimethoxysilane (Silquest ® A-187 available from GE Silicones) Alkylene | Gamma-glycidoxypropyl triethoxy silane (Silquest ® A-1871 available from GE Silicones) + oxidetrimethoxy silane (Silquest ® A-1230 available form GE Silicones) |
| | Weights (grams) | 870.8 | 1478.4 | A-1871; 472.8 + A-1230; 50.0 |
| | Moles | 3.13 | 6.25 | A-1871; 2.0 + A-1230; 0.1 |
| Solvent | Type | Acetone | Ethanol | None |
|  | Weight (grams) | 125 | 360 |  |
| Ion Exchange Resin (Amberlite ® IRA 402 CL available from Rohm and Haas) | Weight (grams) | 24 | 48 | 16 |
| Distilled Water | Weight (grams) | 27 | 54 | 19 |
|  | Moles | 1.5 | 3 | 1.1 |
| Operations | Introduction Time (minutes) | 60 | 105 | 105 |
|  | Post Reaction Time (minutes) | 60 | 125 | 15 |
|  | Distillation Time (minutes) | 60 | 15 | 45 |
|  | Total Reaction Time (minutes) | 180 | 245 | 265 |
| Water/Silane Characterization | Mole Ratio | 0.48 | 0.48 | 0.5 |
|  | Residual Monomer (wt. percent) | 98 | 7.46 | n.t. |
|  | Epoxy content (wt. percent in the neat product) | 15.8 | 20.9 | 15.3 |
|  | Epoxy content (wt. percent in the oligomer portion) | n.a. | 22.9 | n.a. |
|  | Viscosity (mPa·s LV2-30) | 7 cSt | 73 | 7 cSt |
| Product Recovered | Weight (grams) | 857 | 1255 | 483 |
| Weight Loss | grams | 13.8 | 223.4 | 39.8 |

ESO Example 1 shows that a product using isopropanol as a co-solvent and having a high water to silane ratio has a high viscosity. In fact, the product of ESO Example 1 has the behavior of silicone oil. Resulting in difficulties with the filtration of the ion exchange resin, lack of water dispersibility or solubility and/or poor compatibility with organic polymers.

ESO Examples 2 through 9 had viscosities ranging from 86 to 23 mPa·s, which were much lower than the viscosity of the ESO Example 1, which had a viscosity of 680 mPa·s.

ESO Example 7 is the only product for which there was no apparent reaction and pure monomer was recovered (95% monomer content for the recovered material and almost identical epoxy content). This can be explained by the lower hydrolysis rate of the ethoxy groups of gamma-glycidoxypropyl triethoxy silane as compared to the methoxy groups of gamma-glycidoxypropyl-trimethyloxysilane of ESO Examples 2 through 6 and 8.

Epoxy contents measured on all products, except for ESO Example 7, indicate that epoxy rings are still closed and that a significant oligomerization took place for most products. The mass balances also indicate that methanol has been released during the reactions, except for ESO Example 7. Monomeric content of the free epoxy silane monomer left in the oligomers indicates an incomplete reaction.

Higher water to silane ratios gave higher condensation rates and lower residual monomer, as seen in ESO Examples 2, 3, 4, and 5. The optimization of the water to silane ratio as well as the curing conditions, even though not completed, help to reduce the monomer content left into the oligomer. A low monomer content aids in maximizing the conversion rate and thus to meet the Toronto definition of a polymer and increase the overall performance of the ESO. According to the Toronto definition: a "polymer" means a substance consisting of molecules characterized by the sequence of one or more types of monomer units and comprising a simple weight majority of molecules containing at least three monomer units which are covalently bound to at least one other monomer unit or other reactant and consists of less than a simple weight majority of molecules of the same molecular weight. Such molecules must be distributed over a range of molecular weights wherein differences in the molecular weight are primarily attributable to differences in the number of monomer units. In the context of this definition a "monomer unit" means the reacted form of a monomer in a polymer.

Shorter introduction times combined with longer post reaction times increased the conversion rates of ESO Examples 3 and 4 at 12.5 and 16% free monomer, respectively, and ESO Examples 5 and 6 at 22 and 15% free monomer content, respectively.

The use of an ethanol solvent leads to a higher conversion rate (e.g., ESO Example 8, which has a free monomer content below 7.5%). However, the ethanol solvents also lead to higher viscosity products, indicating again that the choice of alcoholic solvent is critical to maintain low viscosity products. Further, analysis of the ESO Example 8 shows that a certain extent of trans-esterification took place as illustrated by the GC analysis, as shown in Table 2 below.

TABLE 2

| Monomer | Content |
| --- | --- |
| 3-glycidoxypropyl(ethoxydimethoxy)silane | 3.32% |
| 3-glycidoxypropyltriethoxysilane (equiv. to Silquest ® A-1871 available from GE Silicones) | 0.21% |
| 3-glycidoxypropyl(diethoxymethoxy)silane | 1.4% |
| 3-glycidoxypropyltrimethoxysilane (equiv. to Silquest ® A-187 available from GE Silicones) | 2.53% |
| Total monomers | 7.46% |

The resulting wt. % epoxy of the ESO Example 8 with correction for individual monomers yields 22.9% significantly lower value than the ESO examples 2 to 6 based on gamma-glycidoxypropyl trimethoxy silane in acetone. This also indicates that trans-esterification took place in this example.

ESO Example 9 is a representative example of an epoxy silane co-oligomer between gamma-glycidoxy propyl trimethoxy silane (e.g., Silquest® A-187 available from GE Silicones) and alkylene oxide tri methoxy silane (e.g., Silquest® A-1230 available from GE Silicones). The wt. % epoxy given for this material indicates that a portion of the epoxy content has been substituted by an ethylene oxide chain, thereby reducing the wt. % epoxy. The weight loss observed during the reaction indicates that methanol has been released during the process. The synthesis was run without any solvent and analysis of the distillate recovered during distillation stage was analyzed as pure methanol.

EXAMPLE 2

Parameters for Water Solubilization of an Epoxy Silane Oligomer

The following examples demonstrate the very satisfactory and superior results obtained when the ESOs, in accordance with the present invention, are made water-soluble by varying the parameters for water solubilization in order to use such oligomers in waterborne formulations. The parameters included pH and the influence of solvents and coalescents as well as influence of surfactants.

Procedure of Test:

In a metallic beaker equipped with magnetic stirrer the different ESO prepared according to said procedure were mixed with appropriate solvent or surfactant or mixture or both (according to Tables 3 to 6), this in order to get a homogeneous phase. Then appropriate amounts of water or boric acid solution (according to Tables 3 to 6) are added under stirring. Mixture is stirred with magnetic stirrer until complete clear solution is obtained. Time for completion of such clear solution and final pH of solutions were reported.

With respect to ESO Example 1, or the reference ESO, it has been observed that except at very high coalescent concentration of Dowanol® DPM, ESO Example 1 is not soluble in water. The level of dipropylene glycol dimethyl ether Dowanol® DPM or the like required to make ESO Example 1 water-soluble would translate into a very high VOC content, far above acceptable ranges for waterborne coatings (above 45% VOC). As such, ESO Example 1 would be too difficult to solubilize and would be more difficult to use in a waterborne formulation (See Table 3 below for test results).

TABLE 3

| | Test Reference | | | | | |
|---|---|---|---|---|---|---|
| | Test 1 | Test 2 | Test 3 | Test 4 | Test 5 | Test 6 |
| Epoxy Silane Oligomer Example 1 (weight percent) | 10 | 10 | 10 | 10 | 10 | 10 |
| Boric Acid (weight percent) | | | | 3.9 | 1.3 | 2.6 |
| Dipropylene glycol dimethyl ether (Dowanol ® DPM available from Dow Chemical Company) (weight percent) | 45 | 30 | 60 | | 30 | 30 |
| $H_2O$ (weight percent) | 45 | 60 | 30 | 86.1 | 58.7 | 57.4 |
| Appearance | Clear | 2 phases | Clear | 2 phases | 2 phases | 2 phases |
| pH | 3.69 | n.a. | 4.09 | n.a. | n.a. | n.a. |
| Time | 36 hours | Not soluble after 1 week | Immediate | Not soluble after 1 week | Not soluble after 1 week | Not soluble after 1 week |

With respect to ESO Example 2, water solubility of the ESO Example 2 data showed that fast solubilization could be achieved with lower solvent content and acidic conditions. In particular, Test 20 is noted as a good compromise in boric acid and Dowanol® DPM contents.

This faster solubilization rate was expected as part of the original design of the oligomer that uses a ratio water to silane of 0.48, leaving some alkoxy groups available for further hydrolysis and also because of lower molecular weight illustrated by lower viscosity of the ESO.

TABLE 4

| | Test Reference | | | | | | | | | | | | | | | |
|---|---|---|---|---|---|---|---|---|---|---|---|---|---|---|---|---|
| | Test 7 | Test 8 | Test 9 | Test 10 | Test 11 | Test 12 | Test 13 | Test 14 | Test 15 | Test 16 | Test 17 | Test 18 | Test 19 | Test 20 | Test 21 | Test 22 |
| Epoxy silane oligomer example 2 (wt. percent) | 10 | 10 | 10 | 10 | 10 | 10 | 10 | 10 | 10 | 10 | 10 | 10 | 10 | 10 | 10 | 10 |
| Boric Acid | | | | | | | 3.9 | 1.9 | 1.3 | 2.6 | 3.2 | 1.3 | 1.1 | 1.0 | 2.6 | 1.3 |
| Dipropylene glycol dimethyl ether (Dowanol ® DPM available from Dow Chemical Company) (wt. percent) | | 45 | 30 | 10 | 5 | 60 | | | | | | 30 | 12.5 | 5 | 30 | 60 |
| $H_2O$ (wt. percent) | 90 | 45 | 60 | 80 | 85 | 30 | 86.1 | 88.1 | 88.7 | 87.4 | 86.8 | 58.7 | 76.4 | 84 | 57.4 | 28.7 |
| Appearance | 2 phases | clear | clear | clear | 2 phases | Clear | Clear | Clear | Clear | Clear | Clear | Clear | Clear | Clear | Clear | Clear |
| pH | 6.85 | 3.98 | 3.67 | 3.7 | 4.05 | 4.33 | 4.13 | 4.84 | 5.32 | 4.86 | 4.33 | 3.57 | 3.61 | 3.74 | 3.52 | 4.16 |
| Time | time 0 | time 0 | 1 h | 18 h | time 0 | time 0 | 18 h | 96 h | 96 h | 18 h | 18 h | 30 min. | 18 h | 18 h | 10 min. | time 0 |

With respect to ESO Example 3, water solubility of the ESO Example 3 was prepared with a water to silane ratio 0.96, which had a higher water to silane ratio as compared to ESO Example 2 having a water to silane ratio of 0.48 tested above. Results, listed in Table 5 below, show that ESO Example 3 is more difficult to solubilize than ESO Example 2. However, with appropriate dispersion times, solubilization could still be achieved after 18 hours. In addition, the higher ratio water to silane leads to higher condensation rates that make the ESO more hydrophobic and less prone to hydrolysis and solubilization.

The introduction of specific surfactants used in the dispersion of metallic powders to improve wettability of the ESOs was used. More particularly, APEO (alkylphenolethoxylate) surfactants having a HLB of 13.3 and 8.9 were used in this test (e.g., Berol® 09 and 26 and Berol® 48 available from AKZO Noble Surface Chemistry, respectively). In addition, an APEO free surfactant was also compared to Berol® 09.

The following test was used to prepare the examples below. First, a pre-blend of surfactant, Dowanol® DPM and ESO Example 2 was prepared. Next, the pre-blend was added into a solution containing water and boric acid. The mixture was then stirred with a magnetic stirrer until a complete solution was obtained. Results are presented in Table 6 below.

TABLE 5

| | Test Reference | | | | | | | | |
|---|---|---|---|---|---|---|---|---|---|
| | Test 23 | Test 24 | Test 25 | Test 26 | Test 27 | Test 28 | Test 29 | Test 30 | Test 31 |
| A-187 | 9.1 | | | | | 1.3 | | | |
| ESO Example 3 | | 9.1 | 9.1 | 8.3 | 7.7 | 7.8 | 8.3 | 9.1 | 8.7 |
| Water | 90.9 | 90.9 | 88.7 | 81.4 | 75.1 | 88.7 | 81.4 | 87 | 84.9 |
| Boric Acid | | | 2.2 | 2 | 1.8 | 2.2 | 2 | 3.9 | 2.1 |
| Ethanol | | | | 8.3 | 15.4 | | | | |
| Dowanol® DPM | | | | | | | 8.3 | | |
| Dipropylene glycol | | | | | | | | | 4.3 |
| Appearance | Clear | 2 phases | 2 phases | 2 phases | White-emulsion | 2 phases | Clear | 2 phases | 2 phases |
| Time | After 1 Hr. | Not soluble after 1 week | Not soluble after 1 week | Not soluble after 1 week | Not soluble after 1 week | Not soluble after 1 week | After 18 Hr. | Not soluble after 1 week | Not soluble after 1 week |

EXAMPLE 3

Influence of Wettability of Said ESO Structures

The following examples demonstrate the effects of surfactants on the ESOs, in accordance with the present invention.

TABLE 6

| | Test Reference | | | |
|---|---|---|---|---|
| | Hydrolysat Test 1 | Hydrolysat Test 2 | Hydrolysat Test 3 | Hydrolysat Test 4 |
| | | ESO Reference | | |
| | ESO Example 2 | ESO Example 2 | ESO Example 2 | ESO Example 3 |
| Water, wt. percent | 70.2 | 69.5 | 71.3 | 71.3 |
| ESO Quantity, percent | 15.4 | 13.7 | 14.1 | 14.1 |
| Dowanol® DPM (Available from Dow Chemical), wt. percent | 12.2 | 9.9 | 10.2 | 10.2 |
| Boric Acid, wt. percent | 2.2 | 0.9 | 1.2 | 1.2 |
| Berol® 09 (Available from AKZO Nobel Surface Chemistry), percent | / | 3 | 3.2 | 3.2 |
| Berol® 26 (Available from AKZO Nobel Surface Chemistry), wt. percent | / | 3 | / | / |
| Solubility time | 18 hrs. | 4 hrs. | 2 hrs. | 18 hrs. |
| Appearance | Clear | Cloudy | Clear | Clear |

Results show that adding an appropriate surfactant can reduce dissolution time or reduce the need for co-solvent and/or acid. An APEO surfactant with an HLB of 13.3 (e.g., Berol® 09) reduces dissolution time better than the combination of APEO surfactants with an HLB of 13.3 and 9.0.

EXAMPLES 4-17

The following examples are related to coating formulations including the use of ESOs, in accordance with the present invention, compared with coating formulations including an epoxy silane monomer. In these examples, most of the work was performed using ESO Examples 2, 3, 5 and 6. The different procedures used to produce the coatings in Examples 4-17 are described in FIGS. 1-5.

Paint Preparation, Application and Testing of Examples 4-17:

All formulations were mixed and dispersed using a Cowles blade disperser with a blade speed of 10 m/min. Metallic powder dispersion requires high torque and was run on 250 ml batches in order to optimize the quality of dispersion.

Stability of the formulations was rated from the hydrogen evolution resistance of the formulations after appropriate storage times. All products were stored in tightly closed PE containers. Generation of foam at the top of the formulations, which in most cases leads to "slow expansion" of the containers, was given as a clear sign of hydrogen generation. Viscosity was adjusted to 20-30 DIN cup number 4 with either water when too high, or HEC (Natrosol® solution available from Hercules) when too low.

Preparation of Test Panels:

Two types of metallic test panels were used. Cold Roll Steel (CRS) and electrogalvanized panels (EG). The CRS panels were prepared by wiping the surfaces of the panel with acetone and then ethanol. Next, the surfaces were brushed with an abrasive/detergent cleaner. Then, the panels were rinsed under tap water and dried with air dryer before applying the paint. The EG panels were prepared by wiping surfaces with acetone and then ethanol. Next, the panels were immerged in a 1% HNO3 solution for 2 minutes. The panels were then rinse under tap water and dried with an air dryer before paint application. All test panels were used immediately after cleaning.

Paint Application and Baking Conditions:

Paint application was performed using a spray gun in a booth. Paint viscosity was adjusted to about 20 DIN cup number 4 by appropriate dilution with water. One application layer was deposited on a test panel with target deposition of 20-25 gr./sqm of dry paint. Curing of paints was performed by air-drying at 70° C. for 20 minutes in an oven followed by baking in an oven at 300° C. for 30 min.

Testing Procedures:

The following test were performed on Examples 4-17: Adhesion test, Cohesion-Metallic Filler Powdering test, Neutral Salt Spray test, and Hot Salt Soak test.

The Adhesion test was made directly on the cured panels according to ISO 2409-1972. The Cohesion-Metallic Filler Powdering test is the evaluation of cohesion of the metallic powders to bind at the surface of the coatings once applied and fully cured. This test reflects the film cohesion and the binding of particles into the film layer. The cohesion-powdering test is carried out by visual evaluation of the quantity of metallic powder removed by a tape adhesive applied on the surface coating according to ISO 2409-1972. After the adhesion test, a visual evaluation of the quantity of metallic powder removed by the tape adhesive applied on the surface coating was made.

High resistance to powdering is noted: Excellent
Medium resistance to powdering is noted: Medium
Low resistance to powdering is noted: Poor The Neutral Salt Spray test, or salt spray test, is an accelerated corrosion test. The purpose of this accelerated corrosion test is to duplicate, in the laboratory, the corrosion performance of a product in the field. The salt spray test has been used extensively in this application for this purpose. The accelerated corrosion test was run according to ISO 7253-1984 with general conditions of tests mentioned here after as follows:

NaCl solution at 50+/−5 g/l
pH of solution between 6.5 to 7.2
Cabinet temperature 35° C.+/−2° C.
Spray rate over a period of 24 h; 1 to 2 ml/h for an 80 sqm surface.
Plates oriented to the top at 20°+/−5°
Red rust is noticed by visual examination.

The corrosion performance was rated according to the number of hours the salt solution described above was sprayed on the surface of a panel until 5% of the surface was covered with red rust. The performance of each of the different coatings was then quoted as the relative hours for 5% red rust coverage related to the amount of coating deposited on the test panel, according to following equation:

$$NSS\text{-Red Rust 5\% (hours/g)} = \text{Red Rust 5\% (hours)} / \text{Coatings deposit (g)}$$

The corrosion resistance of protected panels is quite often quoted as hours of protection against corrosion per micron of deposit.

The Hot Salt Soak test (HSS) is also an accelerated corrosion test that was used for comparison purposes. This test includes immersion of a coating applied on galvanized test panel into a 3% NaCl solution for 5 days at 55° C., which may be equated to a 1000 hour Neutral Salt Spray test program when applied on some protected coated steel or CRS.

In the HSS test, the test panels are first scratched with two parallel scribes (deep into the base metal) about 10 cm long. After immersion in a Hot Soak bath for a predetermined period of time, the panels were washed with tap water and observed for red rust appearance as well as the average creep from scribe. In addition, the NaCl solution was refreshed every 2 days in our tests. Performance was rated in a similar way to that of the Neutral Salt Spray test described above. For instance, time in hours for 5% and the ratio of hours for the 5% coverage of red rust to appear per the weight of the coating deposit, according to the following equation:

$$HSS\text{-Red Rust 5\% (hours/g)} = \text{Red Rust 5\% (hours)} / \text{Coatings deposit (g)}$$

EXAMPLE 4

Using a Monomeric Epoxy Silane of Gamma-Glycidoxypropyl Trimethoxy Silane and the Procedure Described in FIG. 1

In a metallic beaker equipped with mechanical agitation and a Cowles blade, the following components were placed in the beaker: 18.92 weight % of demineralized water, 0.58 weight % of boric acid and 9.0 weight % of Silquest® A-187 (available from GE Silicones). The solution was mixed for 3 hours.

Then, the following ingredients were added while stirring: 33.0 weight % of demineralized water, 0.4 weight % of Hydroxyethylcellulose (Natrosol® HHR 250), 1.5 weight % of APEO surfactant (HLB 13-Berol® 09), 1.5 weight % of APEO surfactant (HLB 9-Berol® 26) and 4.8 weight % of Dowanol® DPM, 2.0 weight % of additional Silquest® A-187.

The components were then mixed together for ten minutes. Next, the following metallic fillers were added under agitation: 28.0 weight % of zinc flake GTT followed by 3.0 weight % aluminum powder Chromal VII. Then, 0.4 weight % of Aerosol®® OT75 (available from Cytec) was added to the final dispersion. During introduction of the components, the speed of the agitator was progressively increased in order to maintain appropriate dispersion torque. Dispersion was maintained for 4 hours.

The final products were then stored for appropriate times (e.g., 2 days, 7 days and three months) before post addition of 2.9 weight % of additional Silquest® A-187.

The protective coating was then applied on the two test panels (an EG and a CRS test panel as described above). A thin and uniform layer of paint was deposited on the test panels using a spray gun. The coating was adjusted to about 20 to 25 g/sqm of cured deposit. This adjustment was calculated after the baking of the plates. The test plates were baked according to curing cycle mentioned above. The cured panels were then tested according to the different procedures described above. Results for Example 4 discussed below.

The Product was stable upon storage and no hydrogen evolution was observed indicating a good protection of metallic particles by silane coupling.

EXAMPLE 4

On a CRS Test Panel After 2 Days of Aging

| Adhesion | 0 - No loss of adhesion |
| --- | --- |
| Powdering resistance | Excellent |
| NSS Red rust 5% | 7.7 hours/g |
| HSS Red Rust 5% | 2.9 hours/g |

EXAMPLE 4

On a CRS Test Panel After 7 Days of Aging

| Adhesion | 0 - No loss of adhesion |
| --- | --- |
| Powdering resistance | Excellent |
| NSS Red rust 5% | 10.9 hours/g |
| HSS Red Rust 5% | 4.2 hours/g |

EXAMPLE 4

On a CRS Test Panel After 3 Months of Aging

| Adhesion | 0 - No loss of adhesion |
| --- | --- |
| Powdering resistance | Medium |
| NSS Red rust 5% | 9.6 hours/g |

EXAMPLE 4

On a EG Test Panel After 7 Days of Aging

| Adhesion | 3 - partial loss of adhesion |
| --- | --- |
| Powdering resistance | Medium |
| NSS Red rust 5% | 24.0 hours/g |
| HSS Red Rust 5% | 13.8 hours/g |

The corrosion resistance achieved with the monomeric silane (e.g., Silquest® A-187 available from GE Silicones) using the procedures described above provided 200 hours of protection on a CRS test panel and 480 hours on a EG test panel for 20 g/sqm of coating deposited on the test panel before more than 5% of the surface of the test panel was covered by red rust.

Aging of the formulation had limited impact on the performance of the coating, but the performance was not achieved before several days. This parameter is critical in the design of protective coatings as it relates to induction times in the pot before final performance can be reached.

EXAMPLE 5

Using Monomeric Glycidoxy Propyl Triethyloxy Silane and the Procedure Described in FIG. 1

In a metallic beaker equipped with mechanical agitation and a Cowles blade, the following components were placed into the beaker: 28.92 weight % of demineralized water, 0.58 weight % of boric acid, 3.0 weight % of Dowanol® DPM and 3.0 weight % of glycidoxy propyl triethyloxy silane (e.g., Silquest® A-1871 available from GE Silicones). The solution was mixed for 3 hours.

Then, the following ingredients were added while stirring: 23.0 weight % of demineralized water, 0.4 weight % of Hydroxyethylcellulose (Natrosol® HHR 250), 1.5 weight % of APEO surfactant (HLB 13-Berol® 09), 1.5 weight % of APEO surfactant (HLB 9-Berol® 26), 1.8 weight % of Dowanol® DPM and 2.0 weight % of additional Silquest® A-1871, available from GE Silicones.

The components were mixed together for ten minutes. Next, metallic fillers were added under agitation: 28.0 weight % of Zinc flake GTT followed by 3.0 weight % of Aluminum powder Chromal VII. Finally, 0.4 weight % of Aerosol®® OT 75 was added to the final dispersion. During introduction, the speed of agitator was progressively increased in order to maintain an appropriate dispersion torque. Dispersion was maintained for 4 hours.

The final products were then stored for 7 days before post addition as a two pack of 2.9 weight % of additional Silquest® A-1871 was made. Product modified with post addition of Silquest A-1871 was also kept in storage for three months for retesting.

Protective coatings were then applied on two test panels (an EG and a CRS test panel as described above). A thin and uniform layer of paint was deposited on the test panels using a spray gun. The coating was adjusted to 20 to 25 g/sqm. This adjustment was calculated after the baking of the test plates. The test plates were baked according to curing cycle described above. The cured test panels were then tested according to the different procedures described above. Results for Example 5 are indicated below as follows:

The product was stable upon storage and no hydrogen evolution was observed indicating a good protection of metallic particles by silane coupling.

EXAMPLE 5

On a CRS Test Panel After 7 Days of Aging

| | |
|---|---|
| Adhesion | 0 - No loss of adhesion |
| Powdering resistance | Poor |
| NSS Red rust 5% | 8.2 hours/g |
| HSS Red Rust 5% | 3.0 hours/g |

EXAMPLE 5

On a CRS Test Panel After 3 Months of Aging

| | |
|---|---|
| Adhesion | 0 - No loss of adhesion |
| Powdering resistance | Medium |
| NSS Red rust 5% | 10.7 hours/g |

EXAMPLE 5

On a EG Test Panel After 7 Days of Aging

| | |
|---|---|
| Adhesion | 5 - no adhesion |
| Powdering resistance | Excellent |
| NSS Red rust 5% | 24.0 hours/g |
| HSS Red Rust 5% | 12.8 hours/g |

Corrosion resistance achieved with monomeric silane, e.g., Silquest® A-1871 available from GE Silicones, provided around 200 hours of protection on a CRS test panel and 480 hours on a EG test panel for 20 g/sqm of coating deposited on the test panel before more than 5% of the surface of the test panel was covered by red rust.

Aging of the formulation has an impact on the performance of the coating. The performance of the coating after two days was significantly lower than after aging for 7 days and 3 months.

EXAMPLE 6

Figure 2:
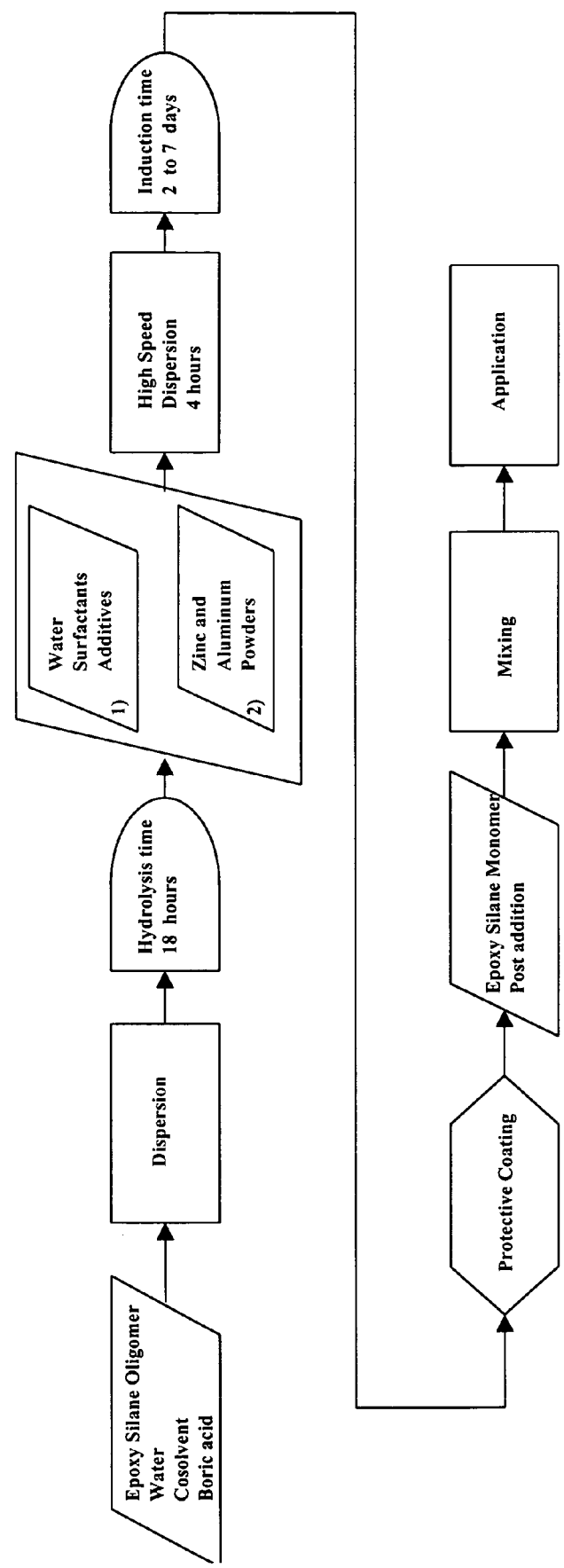
FIG. 2 is a flow diagram describing a process for forming paint in accordance with an embodiment of the present invention.

Using ESO Example 2 Combined with Glycidoxy Tri Ethoxy Silane and the Procedure Described in FIG. 2

In this case, the ESO Example 2 was pre-solubilized in water using the formulation described above with respect to Table 4 and combined with a triethoxy epoxy silane as a two-pack system.

In a metallic beaker equipped with mechanical agitation and a Cowles blade, the following components were placed in the beaker: 30.92 weight % of demineralized water, 0.58 weight % of boric acid, 4.8 weight % of Dowanol® DPM and 4.25 weight % of ESO Example 2. The solution was mixed for 18 hours until a clear solution was obtained.

Then, the following ingredients were added while stirring: 21.75 weight % of demineralized water, 0.4 weight % of Hydroxyethylcellulose (Natrosol® HHR 250), 1.5 weight % of APEO surfactant (HLB 13-Berol® 09) and 1.5 weight % of APEO surfactant (HLB 9-Berol® 26).

The components were then mixed together for ten minutes. Next, the following metallic fillers were added under agitation: 28.0 weight % of Zinc flake GTT followed by 3.0 weight % of Aluminum powder Chromal VII. Finally, 0.4 weight % of Aerosol® OT 75 was added to the final dispersion. During introduction of the components, the speed of the agitator was progressively increased in order to maintain appropriate dispersion torque. Dispersion was maintained for 4 hours.

The final product was then stored for 7 days before post addition as a two pack of 2.9 weight % of glycidoxy propyl triethoxy silane was added. The product was kept for three months and tested without any further addition of glycidoxy propyl triethoxy silane (e.g., Silquest® A-1871 available from GE Silicones) before application.

The protective coating formed above was then applied on the two test panels (an EG test panel and a CRS test panel as described above). A thin and uniform layer of was deposited on the test panels. The coating was then adjusted to around 20 to 25 g/sqm based on a calculation performed after baking of the test plates. The substrates were then baked according to the curing cycle described above. The cured test panels were then tested according to the different procedures described above. Results for Example 6 discussed below.

The Product was stable upon storage and no hydrogen evolution was observed indicating a good protection of metallic particles by silane coupling.

EXAMPLE 6

On a CRS Test Panel After 7 Days of Aging

| | |
|---|---|
| Adhesion | 0 - No loss of adhesion |
| Powdering resistance | Poor |
| NSS Red rust 5% | 8.0 hours/g |
| HSS Red Rust 5% | 2.6 hours/g |

EXAMPLE 6

On an EG Test Panel After 7 Days of Aging

| | |
|---|---|
| Adhesion | 1 - little loss of adhesion |
| Powdering resistance | Excellent |
| NSS Red rust 5% | 25.0 hours/g |
| HSS Red Rust 5% | 18.8 hours/g |

Corrosion resistance achieved by a combination of the ESO Example 2 with post addition of glycidoxy propyl triethoxy silane (e.g., Silquest® A-1871) provided around 160 hours of protection on a CRS test panel and 500 hours on a EG test panel for 20 g/sqm of coating deposited on the test panels before more than 5% of the surface of the test panel would be covered by red rust.

This example shows that an Epoxy silane Oligomer used at the dispersion stage of zinc and aluminum powders and combined with an ethoxy based epoxy silane as a two pack system provide very good stability and corrosion protection.

EXAMPLE 7

Figure 3:
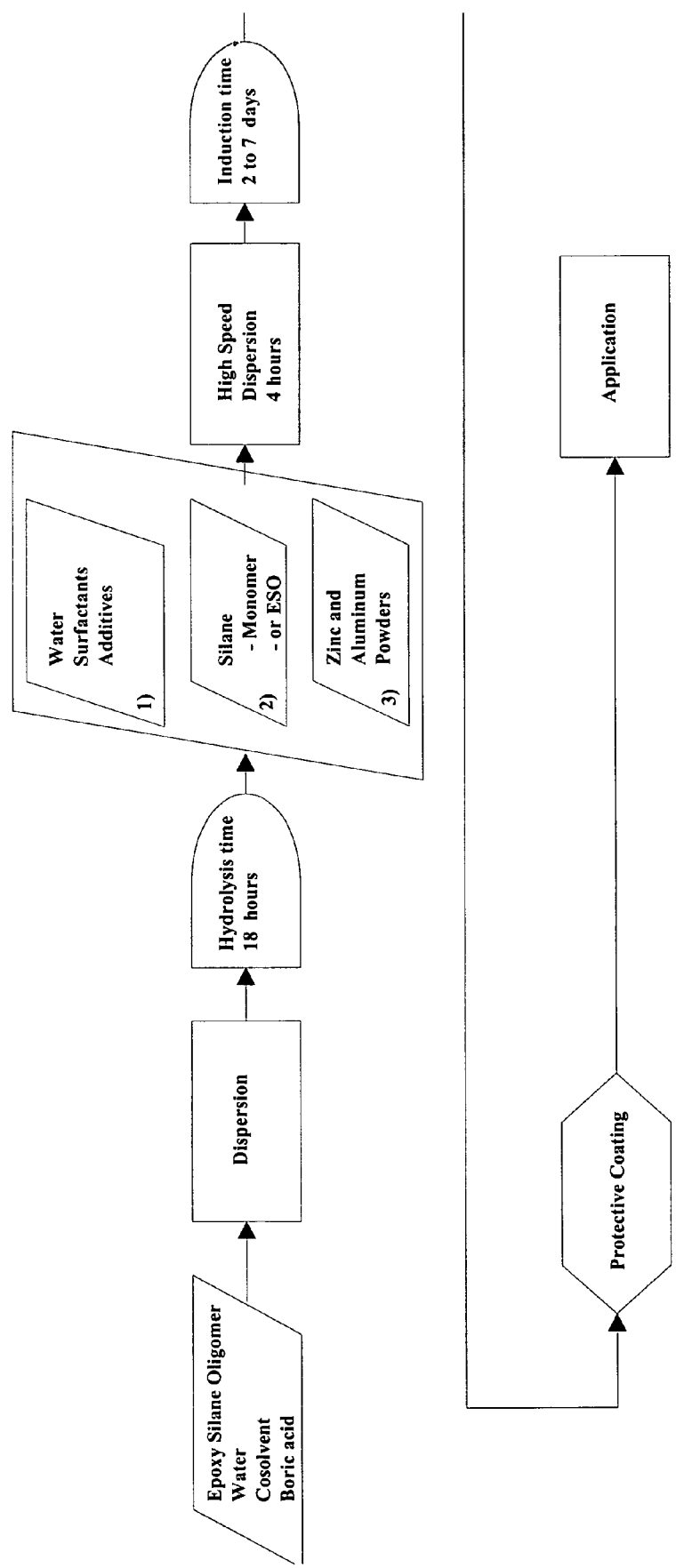
FIG. 3 is a flow diagram describing a process for forming paint in accordance with another embodiment of the present invention.

Using ESO Example 2 and the Procedure Described in FIG. 3.

In this case, the ESO Example 2 was pre-solubilized in water using the formulation described above with respect to Table 4 and combined with a glycidoxy propyl triethoxy silane (e.g., Silquest® A-1871) during the dispersion stage. No further addition of silane was made after dispersion.

In a metallic beaker equipped with mechanical agitation and a Cowles blade, the following components were placed in the beaker: 33.07 weight % of demineralized water, 0.58 weight % of boric acid, 3.3 weight % of Dowanol® DPM and 4.15 weight % of ESO Example 2. The solution was mixed for 18 hours until a clear solution was obtained.

Then, the following ingredients were added while stirring: 19.6 weight % of demineralized water, 0.4 weight % of Hydroxyethylcellulose (Natrosol® HHR 250), 1.5 weight % of APEO surfactant (HLB 13-Berol® 09), 1.5 weight % of APEO surfactant (HLB 9-Berol® 26), and additional 3.0 weight % of glycidoxy propyl triethoxy silane (e.g., Silquest® A-1871).

The components were then mixed together for ten minutes. Next, the following metallic fillers were added under agitation: 28.0 weight % of Zinc flake GTT followed by 3.0 weight % of Aluminum powder Chromal VII. Finally, 0.4 weight % of Aerosol®® OT 75 was added to the final dispersion. During introduction of the components, the speed of the agitator was progressively increased in order to maintain appropriate dispersion torque. Dispersion was maintained for 4 hours.

The final product was then stored for 7 days and three months before application and testing. Application and testing conditions were the same as those described for Example 4. Results for Example 7 are described below.

The product was stable upon storage and no hydrogen evolution was observed, thereby indicating a good protection of metallic particles by silane coupling.

EXAMPLE 7

On a CRS Test Panel After 7 Days of Aging

| | |
|---|---|
| Adhesion | 0 - No loss of adhesion |
| Powdering resistance | Excellent |
| NSS Red rust 5% | 10.0 hours/g |
| HSS Red Rust 5% | 4.0 hours/g |

EXAMPLE 7

On a CRS Test Panel After 3 Months of Aging

| | |
|---|---|
| Adhesion | 0 - No loss of adhesion |
| Powdering resistance | Excellent |
| NSS Red rust 5% | 10.6 hours/g |

EXAMPLE 7

On an EG Test Panel After 7 Days of Aging

| | |
|---|---|
| Adhesion | 1 - little loss of adhesion |
| Powdering resistance | Poor |
| NSS Red rust 5% | 27.7 hours/g |
| HSS Red Rust 5% | 13.8 hours/g |

Corrosion resistance achieved by a combination of ESO Example 2 with addition of Silquest® A-1871 at the dispersion stage provided around 200 hours of protection on a CRS test panel and 550 hours on a EG test panel for 20 grams/sqm of coating deposited on the test panel before more than 5% of the surface of the test panel was covered by red rust. Aging of the formulation did not affect the performance of the coating.

This example shows that an Epoxy silane Oligomer, in accordance with the present invention, combined with an ethoxy based epoxy silane used at the dispersion stage of zinc and aluminum provide very good stability and corrosion protection. The system is in this case is a real one pack system with excellent durability and outperforms the coatings described in Examples 4 and 5.

EXAMPLE 8

Using ESO Example 5 and the Procedure Described in FIG. 3

In this example, the ESO Example 2 was pre-solubilized in water using the formulation described above with respect to Table 4 and also used at the dispersion stage.

In a metallic beaker equipped with mechanical agitation and a Cowles blade, the following components were placed in the beaker: 18.96 weight % of demineralized water, 0.59 weight % of boric acid, 3.3 weight % of Dowanol® DPM and 4.15 weight % of ESO Example 5. The solution was mixed for 18 hours until a clear solution was obtained Then, the following ingredients were added while stirring: 34.2 weight % of demineralized water, 0.4 weight % of Hydroxyethylcellulose (Natrosol® HHR 250), 1.5 weight % of APEO surfactant (HLB 13-Berol® 09), 1.5 weight % of APEO surfactant (HLB 9-Berol® 26), and additional 2.5 weight % of ESO Example 5 was added just before dispersion.

The components were mixed together for ten minutes. Next, the following metallic fillers were added under agitation: 28.0 weight % of Zinc flake GTT followed by 3.0 weight % of Aluminum powder Chromal VII. Finally, 0.4 weight % of Aerosol®® OT 75 was added to the final dispersion. During introduction of the components, the speed of the agitator was progressively increased in order to maintain appropriate dispersion torque. Dispersion was maintained for 4 hours.

The final product was then stored for 7 days and three months before application and testing. Application and testing conditions are the same as those described above for Example 4. Results for Example 5 are discussed below.

The product was stable upon storage and no hydrogen evolution was observed, thereby indicating a good protection of metallic particles by silane coupling.

EXAMPLE 8

On a CRS Test Panel After 7 Days of Aging

| | |
|---|---|
| Adhesion | 0 - No loss of adhesion |
| Powdering resistance | Excellent |
| NSS Red rust 5% | 6.3 hours/g |
| HSS Red Rust 5% | 2.5 hours/g |

EXAMPLE 8

On a CRS Test Panel After 3 Months of Aging

| | |
|---|---|
| Adhesion | 0 - No loss of adhesion |
| Powdering resistance | Excellent |
| NSS Red rust 5% | 9.8 hours/g |

In Example 8 described above, corrosion resistance was achieved by the ESO Example 2 as a soluble binder in water and at the dispersion stage, which provided around 130 hours of protection on a CRS test panel after 7 days of aging, increasing to 196 hours after 3 months of aging, of 20 g/sqm coating deposited on test panel before more than 5% of the surface of the test panel was covered by red rust. Aging of the formulation improved the performance of the coating.

This example illustrates that the use of a pure Epoxy Silane Oligomer, in accordance with the present invention, provides an improved waterborne protective coating.

EXAMPLE 9

Using Epoxy Silane Oligomer ESO Example 5 Combined with a Vinyl Ethoxy Silane and the Procedure Described in FIG. 3

In this example, the ESO Example 5 was pre-solubilized in water using the formulation described above with respect to Table 4 and combined with a vinyl triethoxy silane (e.g., Silquest® A-151 available from GE Silicones) during the dispersion stage.

In a metallic beaker equipped with mechanical agitation and a Cowles blade, the following components were added: 18.96 weight % of demineralized water, 0.59 weight % of boric acid, 3.3 weight % of Dowanol® DPM and 4.15 weight % of ESO Example 5. The solution was mixed for 18 hours until clear solution was obtained.

Then, the following ingredients were added while stirring: 34.8 weight % of demineralized water, 0.4 weight % of Hydroxyethylcellulose (Natrosol® HHR 250), 1.5 weight % of APEO surfactant (HLB 13-Berol® 09), 1.5 weight % of APEO surfactant (HLB 9-Berol® 26), and additional 1.9 weight % of vinyl triethoxy silane.

The components were mixed together for ten minutes. Next, the following metallic fillers were added under agitation: 28.0 weight % of Zinc flake GTT followed by 3.0 weight % of Aluminum powder Chromal VII. Finally, 0.4 weight % of Aerosol® OT 75 was added to the final dispersion. The final product was then stored for 2 and 7 days before application and testing. Application and testing conditions are the same as those described above in Example 4. Results for Example 9 are described below.

The product was stable upon storage and no hydrogen evolution was observed indicating a good protection of metallic particles by silane coupling.

EXAMPLE 9

On a CRS Test Panel After 2 Days of Aging

| | |
|---|---|
| Adhesion | 0 - No loss of adhesion |
| Powdering resistance | Poor |
| NSS Red rust 5% | 8.9 hours/g |
| HSS Red Rust 5% | 3.5 hours/g |

EXAMPLE 9

On a CRS Test Panel After 7 Days of Aging

| | |
|---|---|
| Adhesion | 1 - little loss of adhesion |
| Powdering resistance | Poor |
| NSS Red rust 5% | 10.4 hours/g |
| HSS Red Rust 5% | 2.8 hours/g |

Corrosion resistance achieved by a combination of ESO Example 5 with vinyl triethoxy silane (e.g., Silquest® A-151 available from GE Silicones) at the dispersion stage, which provided about 180 hours of protection on a CRS test panel after 2 days of aging, increasing to 200 hours after 7 days of aging, for a 20 g/sqm of coating deposited on the test panel before more than 5% of the surface of the test panel was covered by red rust. Aging of the formulation did not affect the performance of the coating.

This example shows that an Epoxy silane Oligomer, in accordance with the present invention, combined with a vinyl ethoxy silane used at the dispersion stage of zinc and aluminum provides very good stability and corrosion protection. The system is a real one-pack system with excellent durability. In addition, this system outperforms the coatings described above in Examples 4 and 5.

EXAMPLE 10

Using ESO Example 5 Combined with a Cycloaliphatic Epoxy Silane Triethoxy and the Procedures Described in FIG. 3

In this example, the ESO Example 5 was pre-solubilized in water using the formulation described with respect to Table 4 and combined with a cycloaliphatic epoxy triethoxy silane (Coatosil® 1770 available from GE Silicones) during the dispersion stage.

In a metallic beaker equipped with mechanical agitation and a Cowles blade, the following components were added in the beaker: 18.96 weight % of demineralized water, 0.59 weight % of boric acid, 3.3 weight % of Dowanol® DPM and 4.15 weight % of ESO Example 5 described above herein. The solution was mixed for 18 hours until a clear solution was obtained.

Then, the following ingredients were added while stirring: 33.8 weight % of demineralized water, 0.4 weight % of Hydroxyethylcellulose (Natrosol® HHR 250), 1.5 weight % of APEO surfactant (HLB 13-Berol® 09), 1.5 weight % of APEO surfactant (HLB 9-Berol® 26), and additional 2.9 weight % of cycloaliphatic epoxy triethoxy silane (Coatosil® 1770 available from GE Silicones).

The components were then mixed together for ten minutes. Next, the following metallic fillers were added under agitation: 28.0 weight % of Zinc flake GTT followed by 3.0 weight % of aluminum powder Chromal VII. Finally, 0.4 weight % of Aerosol® OT 75 was added to the final dispersion. The final product was then stored for 2 days and 7 days before application and testing. Application and testing conditions were the same as those described above in Example 4. Results for example 10 are described below.

The product was stable upon storage and no hydrogen evolution was observed indicating a good protection of metallic particles by silane coupling.

EXAMPLE 10

On a CRS Test Panel After 2 Days of Aging

| | |
|---|---|
| Adhesion | 0 - No loss of adhesion |
| Powdering resistance | Poor |
| NSS Red rust 5% | 10.3 hours/g |
| HSS Red Rust 5% | 3.5 hours/g |

EXAMPLE 10

On a CRS Test Panel After 7 Days of Aging

| | |
|---|---|
| Adhesion | 1 - little loss of adhesion |
| Powdering resistance | Excellent |
| NSS Red rust 5% | 9.8 hours/g |
| HSS Red Rust 5% | 2.5 hours/g |

Corrosion resistance achieved by the combination of ESO Example 5 described herein with addition of a cycloaliphatic tri-ethoxy silane (e.g., Coatosil® 1770 available from GE Silicones) at the dispersion stage provided about 200 hours of protection on a CRS test panel after 2 or 7 days of aging for a 20 g/sqm of coating deposited on the test panel before more than 5% of the surface of the test panel was covered by red rust. Aging of the formulation did not affect the performance of the coating.

This example shows that an Epoxy silane Oligomer, in accordance with the present invention, combined with a cycloaliphatic triethoxy silane (Coatosil® 1770 available from GE Silicones) used at the dispersion stage of zinc and aluminum provides very good stability and corrosion protection. The system in this case is a real one-pack system with excellent durability. In addition, this system outperforms the coatings described in Examples 4 and 5 above.

EXAMPLE 11

Using ESO Example 5 Described Herein Above Combined with a Propyl Triethoxy Silane and the Procedure Described in FIG. 3

In this example, the ESO Example 5 was pre-solubilized in water using formulation described above with respect to Table 4 and combined with a non-organo reactive triethoxy silane (e.g., Silquest® A-138 available from GE Silicones) during the dispersion stage.

In a metallic beaker equipped with mechanical agitation and a Cowles blade, the following components were added in the beaker: 18.96 weight % of demineralized water, 0.59 weight % of boric acid, 3.3 weight % of Dowanol® DPM and 4.15 weight % of ESO Example 5. The solution was then for 18 hours until a clear solution was obtained.

Then, the following ingredients were added while stirring: 34.7 weight % of demineralized water, 0.4 weight % of Hydroxyethylcellulose (Natrosol® HHR 250), 1.5 weight % of APEO surfactant (HLB 13-Berol® 09), 1.5 weight % of APEO surfactant (HLB 9-Berol® 26), and an additional 2.0 weight % of propyl triethoxy silane (e.g., Silquest® A-138 available from GE Silicones).

The components were then mixed together for ten minutes. Next, the following metallic fillers were added under agitation: 28.0 weight % of Zinc flake GTT followed by 3.0 weight % of aluminum powder Chromal VII. Finally, 0.4 weight % of Aerosol®® OT 75 was added to the final dispersion. The final product was then stored for 2 days and 7 days before application and testing. Application and testing conditions were the same as those described above in Example 4. Results for Example 11 are discussed below.

The Product was stable upon storage and no hydrogen evolution was observed indicating a good protection of metallic particles by silane coupling.

EXAMPLE 11

On a CRS Test Panel After 2 Days of Aging

| | |
|---|---|
| Adhesion | 0 - No loss of adhesion |
| Powdering resistance | Poor |
| NSS Red rust 5% | 7.6 hours/g |
| HSS Red Rust 5% | 2.2 hours/g |

EXAMPLE 11

On a CRS Test Panel After 7 Days of Aging

| | |
|---|---|
| Adhesion | 0 - No loss of adhesion |
| Powdering resistance | Poor |
| NSS Red rust 5% | 6.3 hours/g |
| HSS Red Rust 5% | 2.4 hours/g |

Corrosion resistance achieved by a combination of ESO Example 5 with combined addition of propyl triethoxy silane (e.g., Silquest® A-138 available from GE Silicones) at the dispersion stage provided about 120 hours of protection on a CRS test panel after 2 or 7 days of aging for 20 g/sqm of coating deposited on the surface of the test panel before more than 5% of the surface of the test panel was covered by red rust. Even though the performances are slightly lower compared to Example 7, it is interesting to note that a non-reactive silane can be used at the dispersion stage together with an ESO, in accordance with the present invention, to provide a stable waterborne zinc rich composition having improved corrosion resistance.

EXAMPLE 12

Figure 4:
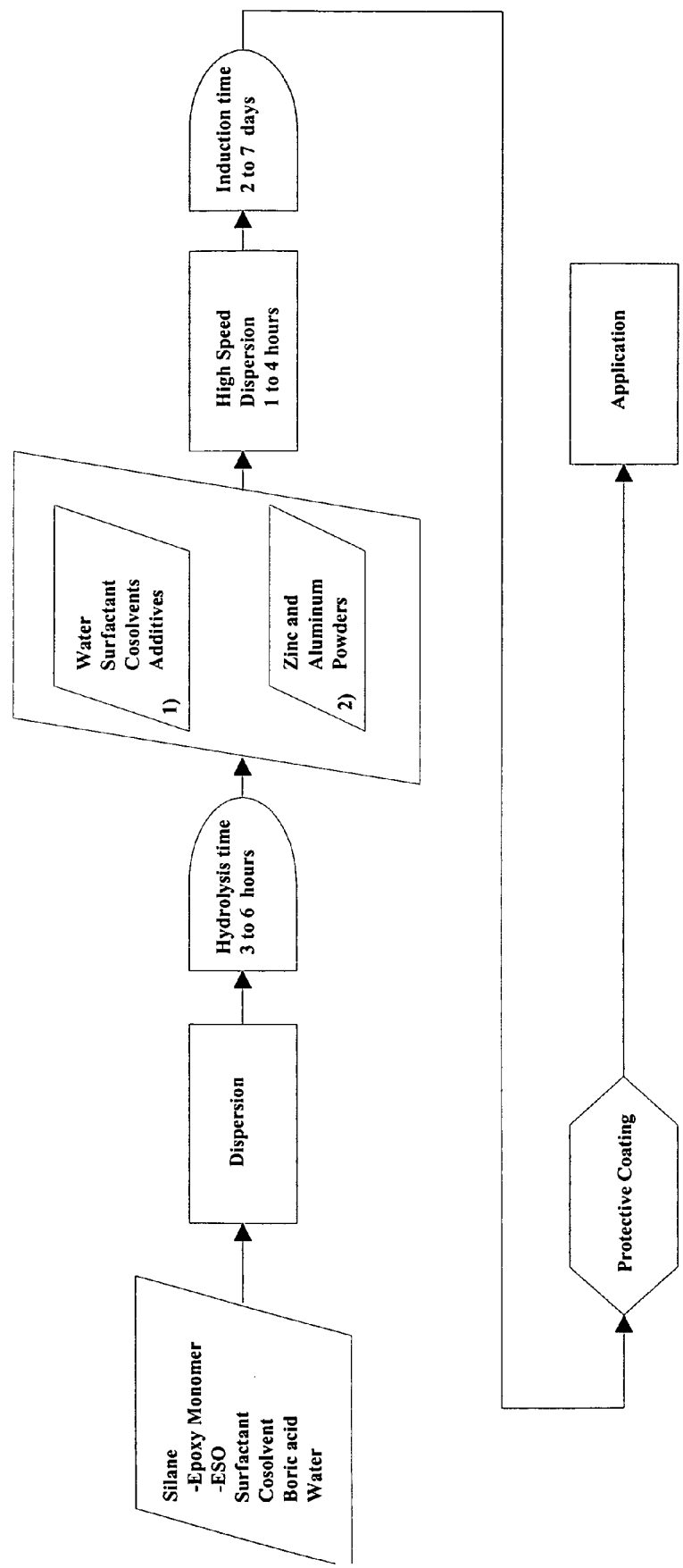
FIG. 4 is a flow diagram describing a process for forming paint in accordance with yet another embodiment of the present invention.

Using ESO Example 3 and the Procedure Described in FIG. 4

In this example, the ESO example 3 was pre-solubilized in water with the formulation described above with respect to Table 4 in using a combination of boric acid, Dowanol® DPM and surfactant. The pre-solubilized ESO was then used alone in a dispersion including metallic powders. This example represents a more simple process of manufacturing, as no further addition is needed at the dispersion stage.

In a metallic beaker equipped with mechanical agitation and a Cowles blade, the following components were added in the beaker: 33.62 weight % of demineralized water, 0.58 weight % of boric acid, 4.8 weight % of Dowanol® DPM, 1.5 weight % of APEO HLB 13 surfactant (Berol® 09) and 6.6 weight % of ESO Example 3. The solution was mixed for 18 hours or until a clear solution was obtained.

Then following ingredients were then added while stirring: 19.6 weight % of demineralized water, 0.4 weight % of Hydroxyethylcellulose (Natrosol® HHR 250), and 1.5 weight % of APEO surfactant (HLB 9-Berol® 26).

The components were mixed together for ten minutes. Next, the following metallic fillers were added under agitation: 28.0 weight % of Zinc flake GTT followed by 3.0 weight % of aluminum powder Chromal VII. Finally, 0.4 weight % of Aerosol® OT 75 was added to the final dispersion. During introduction of the components, the speed of the agitator was progressively increased in order to maintain appropriate dispersion torque. Dispersion was maintained for 4 hours. The final product was then stored for 2 days, 7 days and three months before application and testing. The application and testing conditions were the same as those described in Example 4. Results for Example 12 are discussed below.

The product was stable upon storage and no hydrogen evolution was observed indicating a good protection of metallic particles by silane coupling.

EXAMPLE 12

On a CRS Test Panel After 2 Days of Aging

| | |
|---|---|
| Adhesion | 0 - No loss of adhesion |
| Powdering resistance | Medium |
| NSS Red rust 5% | 11.5 hours/g |
| HSS Red Rust 5% | 2.4 hours/g |

EXAMPLE 12

On a CRS After 7 Days of Aging

| | |
|---|---|
| Adhesion | 0 - No loss of adhesion |
| Powdering resistance | Medium |
| NSS Red rust 5% | 15.4 hours/g |
| HSS Red Rust 5% | 4.5 hours/g |

Corrosion resistance achieved by the use of ESO Example 3 as sole component in a one step process provided about 230 hours of protection on a CRS test panel after 2 days of aging and increasing to over 300 hours after 7 days of aging for 20 g/sqm of coating deposited on the test panel before more than 5% of the surface of the test panel was covered by red rust.

The performances achieved with this specific ESO significantly outperformed a conventional system based on pure monomeric silanes such as Examples 4 and 5. This system is a real one-pack system with excellent durability. The process of manufacturing is simpler than Example 4 and would thus impact manufacturing cost for water borne protective coatings.

EXAMPLE 13

Using ESO Example 2 and the Procedure Described in FIG. 4

In this example, ESO Example 2 was pre-solubilized in water using formulation described above with respect to Table 4 in a combination of boric acid, Dowanol® DPM and a surfactant. This ESO solubilized faster and was used alone in a dispersion of metallic powders. This example represents a more simple and shorter process of manufacturing, as no further addition at the dispersion stage was required.

In a metallic beaker equipped with mechanical agitation and a Cowles blade, the following components were added in the beaker: 33.62 weight % of demineralized water, 0.58 weight % of boric acid, 4.8 weight % of Dowanol® DPM, 1.5 weight % of APEO HLB 13 surfactant (Berol® 09) and 6.6 weight % of ESO Example 2. The solution was mixed for 2 hours or until a clear solution was obtained.

Then, the following ingredients were added while stirring: 19.6 weight % of demineralized water, 0.4 weight % of Hydroxyethylcellulose (Natrosol® HHR 250), and 1.5 weight % of APEO surfactant (HLB 9-Berol® 26).

The components were then mixed together for ten minutes. Next, the following metallic fillers were added under agitation: 28.0 weight % of Zinc flake GTT followed by 3.0 weight % of Aluminum powder Chromal VII. Finally, 0.4 weight % of Aerosol®® OT 75 was added to the final dispersion. During introduction, the speed of the agitator was progressively increased in order to maintain appropriate dispersion torque. Dispersion was maintained for 4 hours. The final product was then stored for 2 or 7 days and three months before application and testing. Application and testing conditions are the same as those described above for Example 4. Results for Example 13 are discussed below.

The product was stable upon storage and no hydrogen evolution was observed indicating a good protection of metallic particles by silane coupling.

EXAMPLE 13

On a CRS Test Panel After 2 Days of Aging

| | |
|---|---|
| Adhesion | 0 - No loss of adhesion |
| Powdering resistance | Poor |
| NSS Red rust 5% | 12.0 hours/g |
| HSS Red Rust 5% | 3.1 hours/g |

EXAMPLE 13

On a CRS Test Panel After 7 Days Aging

| | |
|---|---|
| Adhesion | 0 - No loss of adhesion |
| Powdering resistance | Poor |
| NSS Red rust 5% | 9.6 hours/g |
| HSS Red Rust 5% | 2.5 hours/g |

Corrosion resistance achieved by ESO Example 2, as a sole component in a one step process, was about 240 hours of protection on a CRS test panel after 2 days of aging and over 190 hours after 7 days of aging for 20 grams/m² of coating deposited on the test panel before more than 5% of the surface of the test panel was covered by red rust. The process of manufacturing is simpler than Example 4 and would thus impact manufacturing cost for water borne protective coatings.

EXAMPLE 14

Using ESO Example 6 Combined with a Monomeric Epoxy Silane and the Procedure Described in FIG. 4

In this example, ESO Example 6 was pre-solubilized in water in conjunction with a glycidoxy triethoxy silane (Silquest® A-1871) using the formulation described above with respect to Table 4 and in a combination of boric acid and Dowanol® DPM. The ESO solubilized together with the monomeric silane was used directly for the dispersion of the metallic powders. This example represents a more simple process of manufacturing because no further addition at the dispersion stage was required.

In a metallic beaker equipped with mechanical agitation and a Cowles blade, the following components were added in the beaker: 22.68 weight % of demineralized water, 0.77 weight % of boric acid, 3.85 weight % of Dowanol® DPM, 4.8 weight % of ESO Example 6 and 2.9 weight % of glycidoxy tri ethoxy silane(Silquest® A-1871). The solution was mixed 4 hours until a clear solution was obtained.

Then, the following ingredients were added while stirring: 30.4 weight % of demineralized water, 0.2 weight % of Hydroxyethylcellulose (Natrosol® HHR 250), 1.5 weight % of APEO surfactant (HLB 13-Berol® 09) and 1.5 weight % of APEO surfactant (HLB 9-Berol® 26).

The components were mixed together during ten minutes. Next, the following metallic fillers were added under agitation: 28.0 weight % of Zinc flake GTT followed by 3.0 weight % Aluminum powder Chromal VII. Finally, 0.4 weight % of Aerosol® OT 75 was added to the final dispersion. During introduction, the speed of the agitator was progressively increased in order to maintain appropriate dispersion torque. Dispersion was maintained for 1 hour. The final product was then stored for 2 or 7 days and three months before application and testing.

Application and testing conditions were the same as those described above for Example 4. Results for Example 14 are discussed below.

The product was stable upon storage and no hydrogen evolution was observed indicating a good protection of metallic particles by silane coupling.

EXAMPLE 14

On a CRS Test Panel After 2 Days of Aging

| | |
|---|---|
| Adhesion | 0 - No loss of adhesion |
| Powdering resistance | Excellent |
| NSS Red rust 5% | 9.6 hours/g |
| HSS Red Rust 5% | 3.0 hours/g |

EXAMPLE 14

On CRS After 7 Days Aging

| | |
|---|---|
| Adhesion | 0 - No loss of adhesion |
| Powdering resistance | Excellent |
| NSS Red rust 5% | 9.4 hours/g |
| HSS Red Rust 5% | 3.1 hours/g |

Corrosion resistance achieved by a combination of ESO Example 6 with glycidoxy tri ethoxy silane (e.g., Silquest® A-1871) used in a one step process was about 190 hours of protection on a CRS test panel after 2 or 7 days of aging for 20 grams/sqm of coating deposited on the test panel before more than 5% of the surface was covered by red rust.

The performances achieved with this specific ESO and epoxy silane monomer combination was with respect to total processing time, which was only 5 hours in total. Product was a one-pack system with good performance.

EXAMPLE 15

Figure 5:
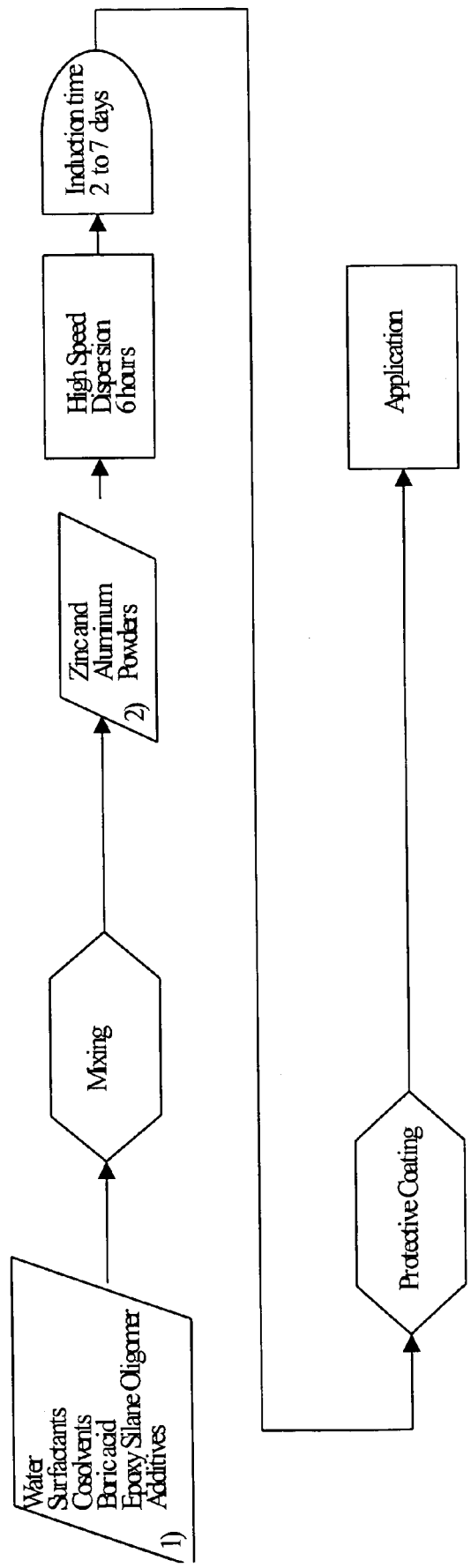
FIG. 5 is a flow diagram describing a process for forming paint in accordance with still another embodiment of the present invention.

Using ESO Example 6 Alone and Directly Solubilized and Dispersed in Water and Metallic Powders and the Procedure Described in FIG. 5

In this example, ESO Example 6 was not pre-solubilized in water prior to the dispersion of pigments. Instead, the ESO was directly added in the formulation using all components and mixed to obtain a homogeneous mixture. The homogeneous mixture was not in a soluble phase until all of the metallic powders were added and dispersed for about 6 hours. This procedure, as described FIG. 5, is a one step process.

In a metallic beaker equipped with mechanical agitation and a Cowles blade, the following components were added in the beaker: 52.49 weight % of demineralized water, 0.51 weight % of boric acid, 5.4 weight % of Dowanol® DPM, 7.7 weight % of ESO Example 6, 0.2 weight % of Hydroxyethylcellulose (Natrosol® HHR 250), 1.5 weight % of APEO surfactant (HLB 13-Berol® 09) and 1.5 weight % of APEO surfactant (HLB 9-Berol® 26).

The components were mixed together for ten minutes. Next, the following metallic fillers were added under agitation: 28.0 weight % of Zinc flake GTT followed by 3.0 weight % of Aluminum powder Chromal VII. Finally, 0.4 weight % of Aerosol® OT 75 was added to the final dispersion. During introduction of the components and ingredients, the speed of the agitator was progressively increased in order to maintain appropriate dispersion torque. Dispersion was maintained for 6 hours.

The final product was then stored for 2 or 7 days and three months before application and testing. Application and testing conditions applied in this example were the same as those described above in Example 4. Results for Example 15 are discussed below.

The product was stable upon storage and no hydrogen evolution was observed indicating a good protection of metallic particles by silane coupling.

EXAMPLE 15

On a CRS Test Panel After 2 Days of Aging

| | |
|---|---|
| Adhesion | 0 - No loss of adhesion |
| Powdering resistance | Excellent |
| NSS Red rust 5% | 9.4 hours/g |
| HSS Red Rust 5% | 2.9 hours/g |

EXAMPLE 15

On a CRS Test Panel After 7 Days of Aging

| | |
|---|---|
| Adhesion | 0 - No loss of adhesion |
| Powdering resistance | Excellent |
| NSS Red rust 5% | 8.3 hours/g |
| HSS Red Rust 5% | 3.8 hours/g |

Corrosion resistance achieved by ESO Example 6 used in a direct dispersion process provided about 180 hours of protection on a CRS test panel after 2 or 7 days of aging for 20 grams/sqm of coating deposited on the test panel before more than 5% of the surface of the test panel was covered by red rust.

The performance achieved with this specific ESO was the total processing time was only 6 hours. This product is a one-pack system with good performance.

EXAMPLE 16

Using ESO Example 6 Alone Which Was Directly Solubilized and Dispersed in Water and Metallic Powders and Using the Procedure Described in FIG. 5

In a metallic beaker equipped with mechanical agitation and Cowles blade, the following components were placed in the beaker: 52.49 weight % of demineralized water, 0.51 weight % of boric acid, 5.4 weight % of Dowanol® DPM, 0.2 weight % of Hydroxyethylcellulose (Natrosol® HHR 250), 1.5 weight % of APEO surfactant (HLB 13-Berol® 09), 1.5 weight % of APEO surfactant (HLB 9-Berol® 26) and 7.9 weight % of Silquest® A-187.

The components were mixed together for ten minutes. Next, the following metallic fillers were added under agitation: 28.0 weight % of Zinc flake GTT followed by 3.0 weight % of Aluminum powder Chromal VII. Finally, 0.4 weight % of Aerosol® OT 75 was added to the final dispersion. During introduction of the ingredients, the speed of the agitator was progressively increased in order to maintain appropriate dispersion torque. Dispersion was maintained for 6 hours. The product was stored for stability examination and showed a strong hydrogen evolution after less than one hour.

Monomeric silane (e.g., Silquest® A-187) cannot be used in a direct dispersion process with metallic powders as the ESOs in accordance with the present invention, e.g., ESO Example 6.

This example illustrates a major difference between a regular monomeric silane and inventive Epoxy Silane Oligomers of current invention disclosure.

EXAMPLE 17

Using ESO Example 9 and the Procedure Described in FIG. 4

In this example, the ESO example 9 was pre-solubilized in water with the formulation described below in using a combination of boric acid, Dowanol® DPM and surfactant. The pre-solubilized ESO was then used alone in a dispersion including metallic powders. This example represents a more simple process of manufacturing, as no further addition is needed at the dispersion stage. This example illustrates the application of an epoxy alkylene oxide silane co-oligomers, in accordance with an embodiment of the present invention, in zinc rich water borne protective coatings.

In a metallic beaker equipped with mechanical agitation and a Cowles blade, the following components were added in the beaker: 32.00 weight % of demineralized water, 0.77 weight % of boric acid, 5.25 weight % of Dowanol® DPM, and 7.0 weight % of ESO Example 9. The solution was mixed for 18 hours or until a clear solution was obtained.

Then, the following ingredients were added while stirring: 23.7 weight % of demineralized water, 1.5 weight % of APEO HLB 13 surfactant (Berol® 09), 0.4 weight % of Hydroxyethylcellulose (Natrosol® HHR 250), and 1.5 weight % of APEO surfactant (HLB 9-Berol® 26).

The components were then mixed together for ten minutes. Next, the following metallic fillers were added under agitation: 28.0 weight % of Zinc flake GTT followed by 3.0 weight % of aluminum powder Chromal VII. Finally, 0.4 weight % of Aerosol®®OT 75 available from Cytec Industries, Inc. was added to the final dispersion. During introduction of the components, the speed of the agitator was progressively increased in order to maintain appropriate dispersion torque. Dispersion was maintained for 4 hours. The final product was then stored for 7 days before application and testing. The final pH of the formulation was stabilized at 6.9 and the viscosity was at 35 seconds with DIN cup number 4.

The application and testing conditions were the same as those described in Example 4. Results for Example 17 are discussed below.

The product was stable upon storage and no hydrogen evolution was observed indicating a good protection of metallic particles by silane coupling.

EXAMPLE 17

On a CRS After 7 Days of Aging

| | |
|---|---|
| Adhesion | 0 - No loss of adhesion |
| Powdering resistance | Excellent |
| NSS Red rust 5% | 13.4 hours/g |
| HSS Red Rust 5% | 4.0 hours/g |

Corrosion resistance achieved by the use of ESO Example 9 as sole component in a one step process provided about 270 hours of protection on a CRS test panel after 7 days of aging for 20 g/sqm of coating deposited on the test panel before more than 5% of the surface of the test panel was covered by red rust.

The performance achieved with this specific ESO significantly outperformed a conventional system based on pure monomeric silanes such as Examples 4 and 5. This system is a real one-pack system with excellent durability. The process of manufacturing is simpler than Example 4 and would thus significantly reduce the cost associated with manufacturing a waterborne protective coating.

It is also observed that it has been possible to increase to the concentration of ESO in the hydrolysis phase of the process. The co-solvent content in Dowanol® DPM was also lower compare to other examples, e.g. Examples 2 to 12.

This indicates that the co-oligomer of an epoxy silane and an alkylene oxide can increase the solubilization rate as well as reduce the amount of coalescent needed to make the ESO water-soluble. Corrosion performances are not affected by the contribution of alkylene oxide into the ESO as prepared in Example 9.

EXAMPLE 18

Using an Epoxy Silane Oligomer Solution of Dynasilan® HS 2926 and the Procedure Described in FIG. 4

A pre-solubilized Epoxy Silane Oligomer according to present invention disclosure does not perform similarly to Epoxy Silane Oligomer made in water as currently exists commercially with a product called Dynasilan® HS 2926 (Available from Degussa Huls).

In this example, a comparison was made between the material Dynasilan® HS 2926 in the same formulation as described above in Examples 12 and 13.

The product was used at equal loading of siloxane assuming that the dry content given for the product was 40% of non volatile as indicated. In this case, the HS 2926 was already solubilized in water and was directly used for the dispersion of the metallic powders.

In a metallic beaker equipped with mechanical agitation and a Cowles blade, the following ingredients were added while stirring: 16.6 weight % of Dynasilan® HS 2926, 43.62 weight % of demineralized water, 0.58 weight % of boric acid, 1.5 weight % of APEO surfactant (HLB 13-Berol® 09), 1.5 weight % of APEO surfactant (HLB 9-Berol® 26), and 4.8 weight % of Dowanol DPM.

The components were then mixed together for ten minutes. Next, the following metallic fillers were added under agitation: 28.0 weight % of Zinc flake GTT followed by 3.0 weight % of Aluminum powder Chromal VII. Finally, 0.4 weight % of Aerosol® OT 75 was added to the final dispersion. During introduction of the components, the speed of the agitator was progressively increased in order to maintain appropriate dispersion torque. Dispersion was maintained for 4 hours.

The product was stored and followed with respect to stability. After a couple of hours, strong hydrogen evolution occurred, and the product generated a significant quantity of foam. Thus, indicating that poor stability of the product as compared to formulations in Examples 12 and 13.

This example illustrates that the structure of the ESOs in accordance with the present invention provided stable products with varying water solutions as compared to an already hydrolyzed epoxy silane oligomer (e.g., Dynasilan® HS 2926).

Water Borne Pigment Dispersions and Their Uses

EXAMPLE 19

Figure 6:
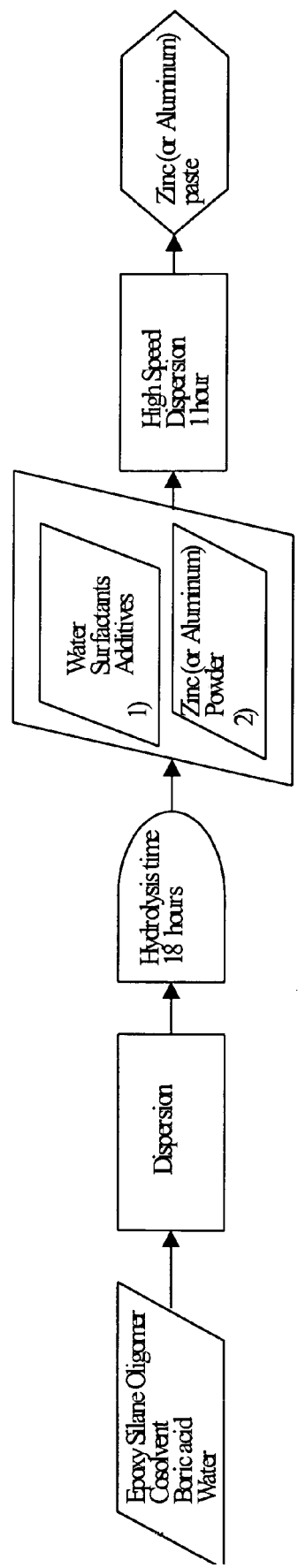
FIG. 6 is a flow diagram describing a process for forming a metal paste in accordance with another embodiment of the present invention.

Aluminum Paste Dispersion Prepared Using the Procedure Described in FIG. 6

The process used in this example was similar to the process used in Example 12 described above except that the aluminum powder was used alone at a higher concentration (36.1% instead of 28% of Zinc together with 3% of Aluminum).

The ratio of silane to the pigment was adjusted to 1 of the ESO to 9 of the aluminum. The purpose here is to prepare aluminum concentrates that can be further extended with additional binders to formulate aluminum containing coatings.

In a metallic beaker equipped with mechanical agitation and Cowles blade, the following ingredients were added while stirring: 56.23 weight % of demineralized water, 0.47 weight % of boric acid, 0.94 weight % of APEO surfactant (HLB 13-Berol® 09), 0.94 weight % of APEO surfactant (HLB 9-Berol® 26), 2.7 weight % of Dowanol® DPM and 3.41 weight % of ESO Example 6. The components were dispersed for 18 hours until clear solution was obtained. Next, 35.3 weight % Aluminum powder Chromal VII was added. During introduction of the ingredients, the speed of the agitator was progressively increased in order to maintain appropriate dispersion torque. Dispersion was maintained for 4 hour.

The obtained product was stored for 2 months and followed with respect to stability. During this period of aging no hydrogen evolution was observed. A settlement was observed but was easily re-suspended with gentle stirring.

EXAMPLE 20

Zinc Powder Pigment Paste

The same procedure, see FIG. 6, was applied in this example as in Example 18 for aluminum except in this example Zinc powder was used in lieu of Aluminum powder. Due to the higher density of the zinc powder, the Zinc content was increased up to 56 weight %. The purpose here is to prepare zinc concentrates than can be further extended with additional binders to formulate aluminum containing coatings.

In a metallic beaker equipped with mechanical agitation and a Cowles blade, the following ingredients were added while stirring: 33.1 weight % of demineralized water, 0.60 weight % of boric acid, 1.3 weight % of APEO surfactant (HLB 13-Berol® 09), 1.3 weight % of APEO surfactant (HLB 9-Berol® 26), 3.4 weight % of Dowanol® DPM and 4.30 weight % of ESO Example 6.

The components were dispersed for 18 hours until clear solution was obtained. Next, 56 weight % of Zinc flake GTT was added while stirring and dispersed. During introduction of the components, the speed of the agitator was progressively increased in order to maintain appropriate dispersion torque. Dispersion was maintained for 4 hours.

The obtained product was stored for 2 months and followed with respect to stability. During this period of aging no hydrogen evolution was observed. A settlement was observed but was easily re-suspended with gentle stirring.

EXAMPLE 21

Figure 7:
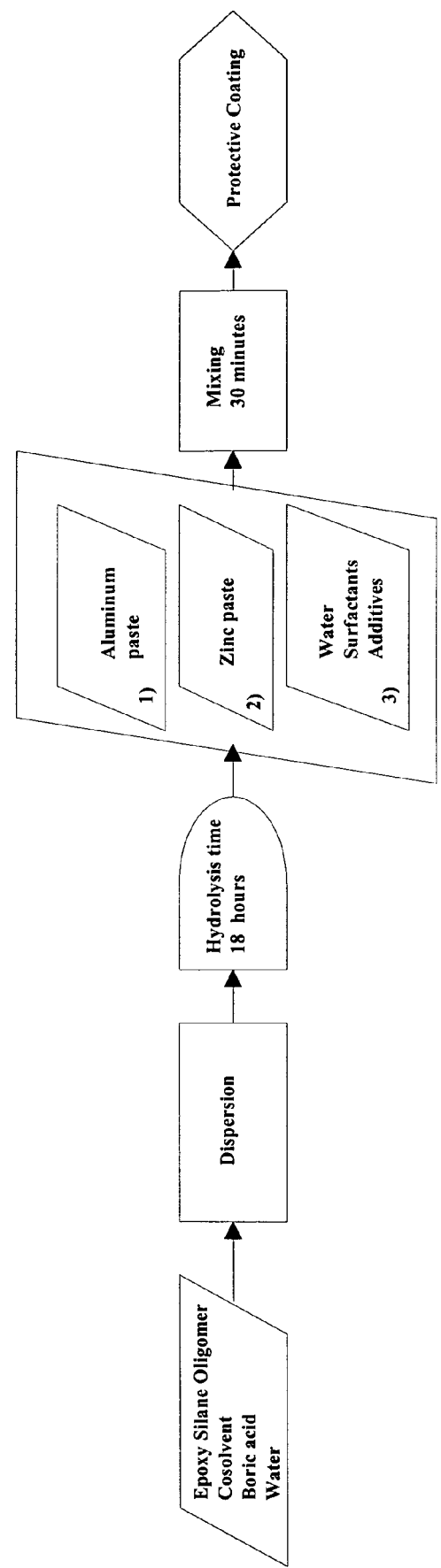
FIG. 7 is a flow diagram describing a process for forming a protective coating in accordance with another embodiment of the present invention.

Protective Coating by Pigment Paste Mixing Using The Procedure Described in FIG. 7

In this example the zinc and aluminum content used in the previous Example 5 and following were introduced using the aluminum and zinc pastes prepared respectively according to Examples 19 and 20. The two pastes are simply mixed with ESO solution as described in previous examples.

In a metallic beaker equipped with mechanical agitation and a Cowles blade, the following ingredients were added while stirring: 23.87 weight % of demineralized water, 0.74 weight % of boric acid, 4.1 weight % of Dowanol® DPM and 5.29 weight % of ESO Example 6. The components were mixed for 18 hours until a clear solution was obtained.

Next, 50 weight % of Zinc paste (Example 20) and 8.5 weight % of aluminum paste (Example 19) followed by 0.4 weight % of Aerosol® OT 75, 0.15 weight % of Natrosol® 250 HRR in 6.95 weight % of demineralized water were added while stirring and mixed for 30 minutes.

Application and testing conditions were the same as those discussed above in Example 4. Results for Example 21 are discussed below.

The product was stable upon storage and no hydrogen evolution was observed indicating a good protection of metallic particles by silane coupling.

EXAMPLE 21

On a CRS Test Panel After 2 Days of Aging

| Adhesion | 0 - No loss of adhesion |
|---|---|
| Powdering resistance | Excellent |
| NSS Red rust 5% | 8.5 hours/g |
| HSS Red Rust 5% | 3.1 hours/g |

EXAMPLE 21

On a CRS Test Panel After 7 Days of Aging

| Adhesion | 0 - No loss of adhesion |
|---|---|
| Powdering resistance | Excellent |
| NSS Red rust 5% | 8.4 hours/g |
| HSS Red Rust 5% | 3.3 hours/g |

Corrosion resistance achieved by the formulation of this example provided about 170 hours of protection on a CRS test panel after 2 or 7 days of aging for 20 grams/sqm of coating deposited on the test panel before more than 5% of the surface of the test panel was covered by red rust. Product is still a one-pack system with good performance.

It was observed according to Examples 19 and 20 can be used as a simple blend or mixed with additional binder systems based on ESO prepared in accordance with the present invention. It was also observed that the zinc and aluminum pastes prepared in Examples 19 and 20, in accordance with exemplary embodiments of the present invention, can be combined with a monomeric silane or other epoxy silane oligomer solutions as tested in Example 18.

EXAMPLE 22

Metallic Inks or Coating by Pigment Paste Mixing

In Examples 19 and 20, it was demonstrated that the pigment pastes disclosed therein could be used in a simple blend with a conventional styrene acrylic resin as typically employed in the printing ink and coating industry. In the present example, a styrene acrylic latex was selected and simply mixed with an aluminum paste according to following procedure.

In a metallic beaker equipped with mechanical agitation and a Cowles blade, the following ingredients were added while stirring: 60 weight % of a styrene acrylic latex (e.g., Worleecryl® 8410 available from Worlee Gmbh) and 60 weight % of aluminum paste produced according to Example 19 discussed above. The components were mixed for 10 minutes.

This example (referring to "ESO based Al" in following Table 8 below) illustrates that it is possible to prepare aluminum-based coatings or inks by simply mixing a pre-dispersed aluminum with a solubilized ESO, in accordance with the present invention.

In order to compare the performance and stability of such a preparation, a dispersion of the same aluminum powder was made directly into a styrene-acrylic latex selected according to following procedure:

In a metallic beaker equipped with mechanical agitation and Cowles blade, the following ingredients were added while stirring: 84.0 weight % of Worleecryl® 8410 (styrene acrylic resin available form Worlee Gmbh), 1.0 weight % of APEO surfactant (HLB 13-Berol® 09), 1.0 weight % of APEO surfactant (HLB 9-Berol® 26). The components were mixed for 10 minutes. Next, 14.0 weight % of aluminum powder Chromal VII was added. During introduction of the aluminum, the speed of the agitator was progressively increased in order to maintain appropriate dispersion torque. Dispersion was maintained for 30 minutes.

This example (referring to "Direct dispersion process" in Table 8 below) illustrates the typical preparation used to make an aluminum-based coating or ink in styrene acrylic latexes.

TABLE 8

| Paste | Direct dispersion process | ESO based Al |
|---|---|---|
| Worleecryl ® 8410 (available from Worlee Gmbh) | 84 parts | 60 parts |
| Berol ® 09 | 1 part | / |
| Berol ® 26 | 1 part | / |
| Aluminum powder Chromal VIII | 14 parts | / |
| Aluminum paste (ESO Example 19) | / | 40 parts |
| Operation | Disperse 30 minutes | Mix 10 minutes |

The formulation prepared according to the direct dispersion mode was not stable at all. The direct dispersion product experienced strong degazing and foaming during first hours of storage. Whereas, the product based on ESO dispersed paste was very stable for more than 2 months.

The simple blend of the ESO aluminum paste, in accordance with the present invention, was stable and could be applied using standard hand drawer on paper.

The coating realized has very good printing quality as well as gloss. Similar behaviour was achieved by the use of the Zinc paste dispersed in ESO. Such combination of Zinc paste with anionic resins could give the possibility to prepare zinc rich coatings based on latexes or dispersions or shop primers.

EXAMPLE 23

In another aspect of the use of current ESOs, it was demonstrated in following example that it is possible to use an ESO as external crosslinker for waterborne latexes. It is known in prior art that Epoxy silane monomers can be used as crosslinkers in anionic or cationic-based latexes and water dispersions. In following examples, a typical wood coating formulation was used as model system to show what the influence the current ESOs have on such formulations as well as to compare the use of the current ESOs to conventional epoxy silane monomers. Formulation was prepared according to Table 9 below using the following procedure.

In a metallic beaker equipped with mechanical agitation and Cowles blade, the following ingredients were added while stirring: 69.52 weight % of Acrylic latex SCX® 8225 (Available from SC Johnson Polymer), 1.185 weight % of Wetlink 78 (formulation 2 in Table 9) or 1.185 weight % of Epoxy Silane Oligomer ESO Example 5 (formulation 3 in Table 9). The formulation was stirred for 30 minutes. Next, added to the formulation was 0.2 weight % of a wetting agent (e.g., Coatosil® 1211 available from GE Silicones), 9.0 weight % of Coalescent (e.g., Proglyde® DPnB available from Dow Chemical), 4.3 weight % of matting wax (e.g., Aquamat® 128 available from Byk Cera), 2.5 weight % of PE wax (Ultralub® D819 available from Keim-Additec Surface) and a necessary amount of water to make 100 weight %. The components were then mixed for 30 minutes. As a non-modified standard, the same formulation was applied without any silane (formulation 1 is listed in Table 9).

Typical epoxy silanes used as an external crosslinker for anionic latexes was used for comparison to gamma-glycidoxypropylmethyldiethoxy silane (Wetlink® 78 available from GE Silicones).

TABLE 9

|  | Formulation | | |
| --- | --- | --- | --- |
|  | Formulation 1 | Formulation 2 | Formulation 3 |
| Acrylic latex SCX ® 8225 (Available from SC Johnson Polymer), weight percent | 69.52 | 69.52 | 69.52 |
| Water, weight percent | 9.48 | 8.295 | 8.295 |
| Epoxy silane (e.g., Wetlink ® available from GE Silicones), weight percent |  | 1.185 |  |
| Epoxy Silane Oligomer (ESO Example 5), weight percent |  |  | 1.185 |
| Wetting Agent (e.g., Coatosil ® 1211 available from GE Silicones), weight percent | 0.2 | 0.2 | 0.2 |

TABLE 9-continued

|  | Formulation | | |
| --- | --- | --- | --- |
|  | Formulation 1 | Formulation 2 | Formulation 3 |
| Coalescent (e.g., Proglyde ® DPnB available from Dow Chemical), weight percent | 9 | 9 | 9 |
| Matting Wax (e.g., Aquamat ® 128 available from Byk Cera), weight percent | 4.3 | 4.3 | 4.3 |
| PE wax (Ultralub ® D819 available from Keim-Additec Surface), weight percent | 2.5 | 2.5 | 2.5 |
| Water, weight percent | 5 | 5 | 5 |

In a first set of tests applied on the modified polymers, the mixtures of acrylic latex with water and corresponding epoxy silane monomer or oligomer were applied in Teflon cells after appropriate curing at room temperature for 15 days. Films so formed were then peeled out of the Teflon cells and accurately weighed before immersion in water. Water absorption and polymer remaining after further drying was measured. Gel content was also measured on the same samples. Results are given in Table 10 below.

TABLE 10

|  | Formulation | | |
| --- | --- | --- | --- |
|  | Formulation 1 | Formulation 2 | Formulation 3 |
| Water absorption (percent of water absorbed) | Dissolved | 25% | 22% |
| Water resistance (percent of polymer remaining after drying at RT) | 77% | 98% | 98% |
| Gel content (percent of polymer left after 8 hours of extraction in MEK) | 0% | 94% | 95% |

The results show that an ESO, in accordance with the present invention, significantly enhances the water resistance of anionic latexes to a level at least comparable to Epoxysilane monomers.

In a second set of tests, full coatings of Formulations 1-3 were applied on glass substrates in order to allow measurement of hardness. 200 microns of the coatings were applied on the glass substrates and dried for increasing period of time during which Koenig Hardness was followed. Table 11 below shows the hardness evolution of the films.

TABLE 11

|  | Koenig Hardness (Seconds) | | |
| --- | --- | --- | --- |
| Time of drying (days @ 23° C.-50% HR) | Formulation 1 | Formulation 2 | Formulation 3 |
| 1 | 29.8 | 36.4 | 36.8 |
| 4 | 82.6 | 84.0 | 85.8 |
| 7 | 84.0 | 86.8 | 89.6 |
| 11 | 88.7 | 91.0 | 90.0 |
| 16 | 93.3 | 93.8 | 97.0 |
| 22 | 91.4 | 93.8 | 97.1 |

The results show that an ESO, e.g., ESO Example 5 significantly enhances the hardness of the wood coating. In fact, the results were even better than the use of a conventional epoxy silane monomer.

Finally, the full Formulations 1-3 were applied on wood panels (oak plywood) using a spray gun. A deposit of 150 g/sqm was applied and further dried for 15 days at room temperature.

Staining resistance was then tested according to the conditions listed in Table 12 below. Results are illustrated in Table 13 below.

TABLE 12

Spot test according to the test method DIN 68861 - 1B
Coatings are cured 15 days at room temperature

| Liquid test: | Acetone | 10 seconds |
| --- | --- | --- |
| | Ammonia 10% | 2 minutes |
| | Ethanol 48% | 60 minutes |
| | Isopropanol 50% | 60 minutes |
| | Acetic acid | 60 minutes |
| | Ethyl-butyl acetate | 10 seconds |

Deposit: 30 μl covered with glass cup

Rating:
(0): no change
(1): minor changes in gloss or color
(2): changes in gloss or color but no surface damage
(3): major changes visible but no real damage of the surface
(4): major changes visible and surface damage
(5): most of the exposed surface damaged

TABLE 13

Chemical resistance (DIN68861-1B)

| Staining agent - contact time | Formulation 1 | Formulation 2 | Formulation 3 |
| --- | --- | --- | --- |
| Acetic acid - 60 minutes | 5 | 0 | 1 |
| Ammonia (10%) - 2 minutes | 5** | 5* | 2 |
| Ethylalcohol(48%) - 60 minutes | 0 | 0 | 0 |
| Isopropanol(50%) - 60 minutes | 0 | 0 | 0 |
| Acetone - 10 seconds | 3 | 1 | 1 |
| Ethyl-Butyl acetate - 10 seconds | 3 | 1 | 0 |

* = surface of coating is not physically damaged but staining of wood is visible
** = surface of coating is physically damaged and strong staining is visible.

Here again, the results show that ESO Example 5 significantly enhances the chemical resistance and staining resistance of a wood coating. The effect is most particularly quite obvious in staining resistance against ammonia solution for which the wood staining is significantly reduced.

This example test exhibits the possibility to use ESO as external crosslinkers into acrylic latexes or also as anti-stain agent for wood coatings.

EXAMPLES 24-26

Solubilizing ESO Example 6 in Water Under ACIDIC Conditions, Dispersing Metallic Powders Therein and Testing the Same

EXAMPLE 24

Preparation of the Pre-solubilizing ESO Example 6 in Water

This example describes the pre-solubilization of ESO Example 6 in water to be used later on for the dispersion of a metallic powder therein. Example 24 was prepared by the following method. The following ingredients were added under continuous agitation in a metallic beaker equipped with mechanical agitation and a Cowles blade: 10.0 weight percent of ESO Example 6, 5.0 weight percent of Dowanol DPM, 30.0 weight percent of a 45/l solution of boric acid in demineralised water and 5.0 weight percent of demineralised water. The solution was mixed for 7 days until a clear solution was obtained.

EXAMPLE 25

Preparation of a Metallic Dispersion

Example 25 illustrates the dispersion of metallic powders in the solution of Example 24. In this example, zinc aluminum alloy in paste, available from Eckaart, was used instead of regular zinc aluminum alloy flakes and zinc flakes mixed together.

Example 25 was prepared by the following method: under continuous agitation, 2.2 weight percent of APEO free surfactant (HLB 13-Berol® 48), 1.9 weight percent of APEO free surfactant (HLB 9-Lauroxal 3) and 0.5 weight percent of Y-15702 (siloxane defoamer available from GE Silicones) were added to the solution obtained in Example 24 and mixed for ten minutes. Next, under continuous agitation, 35.0 weight percent of zinc aluminum alloy paste (STAPA ZnAl 7 paste available from Eckaart Germany) and 5.0 weight percent of zinc flake powder (Zinc flake GTT available from Eckaart Germany) were added to the mixture. During introduction, the speed of the agitator was progressively increased in order to maintain appropriate dispersion torque. Dispersion was maintained for 1 hour at 900 rpm. After dispersion, 0.4 weight percent of Aerosol® OT 75 was added to the dispersion and stirred for 10 minutes at 500 rpm. Finally, 5.5 weight percent of a 2% HEC solution in water was added into the dispersion and mixed for 10 minutes at 500 rpm. The final dispersion had a viscosity of 32 seconds DIN cup number 4 and pH of 6.9.

The resulting dispersion was then stored for appropriate times (e.g., 2 days, 7 days and three months) before post addition of 2.9 weight percent of additional Silquest® A-187. The product was stable upon storage and no hydrogen evolution was observed indicating good protection of metallic particles by a silane of the present invention.

EXAMPLE 26

Applying a Thin Coat of Example 25 on a CRS Text Panel

Example 26 describes the application of Example 25 on a CRS test panel and test results of the same. A thin uniform layer of Example 25 was deposited on a test panel using a spray gun. The coating was adjusted to about 20 to 25 g/sqm of cured deposit. This adjustment was calculated after the baking of the plate. The test plate was baked according to curing cycle mentioned above. The cured panel was then tested according to the different procedures described above in Example 4. Results for Example 26 are discussed below.

EXAMPLE 26

Results of Example 25 on a CRS Test Panel After 1 Day of Aging

| Adhesion | 0 - No loss of adhesion |
| --- | --- |
| Powdering resistance | Excellent |
| NSS red rust apparition in scratch | 552 hours |
| NSS red Rust apparition on the surface | 650 hours |

Corrosion resistance achieved by a combination of ESO Example 6 with addition of co-solvent and solubilization in acidic conditions was about 650 hours of protection on a CRS test panel after 1 day of aging for 30 grams/sqm of coating deposited on the test panel before more than 5% of the scratch was covered by red rust. Further, during testing, it was noted that white rust did not appear until after 552 hours of salt spray exposition, and red rust did not appear on the surface of the panel until after 650 hours of exposition and the scratch was covered by 5% of red rust after 650 hours of exposition.

These results illustrate the dramatic impact that the filler choice and formulation can have on the corrosion resistance of a waterborne protective coating. In this area, zinc aluminum alloy tend to offer much better corrosion protection.

EXAMPLE 27-29

Solubilizing ESO Example 6 in Water Under ACIDIC Conditions, Dispersing Metallic Powders Therein and Testing the Same

EXAMPLE 27

Solubilizing ESO Example 6

This example describes the pre-solubilization of ESO Example 6 in water under acidic conditions followed by neutralization. The pre-solubilized ESO will be used later for the direct dispersion of metallic powders therein. In this example, zinc aluminum alloys paste available from Eckaart were used.

Example 27 was prepared by the following method. The following ingredients were added under continuous agitation in a metallic beaker equipped with mechanical agitation and a Cowles blade: 10.2 weight percent of ESO Example 6, 5.1 weight percent of dipropylene glycol and 10.0 weight percent of a 45/1 solution of boric acid in demineralised water. The resulting mixture was then mixed for 2 hours until a clear solution was obtained. The pH was then adjusted to about 6.5 with 3.4 weight percent of a 1/1 solution of caustic soda in demineralised water. The solution was stored in neutral conditions for 18 hours before use.

EXAMPLE 28

Dispersion of Metallic Powder into the Solution of Example 27

Example 28 illustrates the dispersion of metallic powder in the solution obtained in Example 27. Example 28 was prepared by the following method: under continuous agitation, 2.2 weight percent of APEO free surfactant (HLB 13-Berol® 48), 1.9 weight percent of APEO free surfactant (HLB 9-Lauroxal 3) and 0.5 weight percent of siloxane defoamer (Y-15702 available from GE Silicones) were added to the solution obtained in Example 27 and mixed for 10 minutes. Next, under continuous agitation, 39.0 weight percent of a 90% zinc aluminum alloy paste in mineral spirit (STAPA 4 ZnAl 7 paste available from Eckaart Germany) followed by 5.0 weight percent of a 90% Zinc flake powder in di-propylene glycol paste (STAPA DG GTT available from Eckaart Germany) were added to the mixture. During introduction of the metallic powders, the speed of the agitator was progressively increased in order to maintain appropriate dispersion torque. Dispersion was maintained for 1 hour at 900 rpm. 0.4 weight percent of Aerosol® OT 75 was then added to the dispersion and mixed for 10 minutes at 500 rpm. Finally, 12.3 weight percent of water and 5.0 weight percent of a 2% HEC solution in water was added into the dispersion and agitated for 10 minutes at 500 rpm. The final dispersion had a viscosity of 29 seconds DIN cup number 4 and pH of 6.8. After 20 days, a very slight Hydrogen evolution was observed.

EXAMPLE 29

Applying and Testing of the Dispersion of Example 28

The application and testing conditions used in this example are the same as those described above in Example 4. The results for Example 29 are discussed below.

EXAMPLE 29

Results After 1 Day of Aging

| Adhesion | 0 - No loss of adhesion |
| --- | --- |
| Powdering resistance | Excellent |
| NSS Red rust apparition in scratch | 384 hours |
| NSS Red Rust apparition on the surface | >720 hours |

Corrosion resistance achieved by a combination of ESO Example 6 with addition of co-solvent and solubilization in acidic conditions before neutralization to near neutral conditions was about 720 hours of protection on a CRS test panel after 1 day of aging for 30 grams/sqm of coating deposited on the test panel. During testing, it was observed that white rust did not appear in the scratch before 384 hour of salt spray exposition, red rust did not appear on the surface of the panel before 720 hours of exposition and the scratch was covered by 5% of red rust only after 552 hours of exposition.

This example illustrates the solubilization of an ESO of the present in acidic conditions and neutralizing the solution prior to dispersion of the metallic fillers, thereby stabilizing metallic fillers with higher sensitivity to pH conditions.

EXAMPLES 30-32

Preparation of a Waterborne Shop Primer Using ESO Example 6, Application and Testing of Same

EXAMPLE 30

Pre-Solubilization of ESO Example 6

Example 30 illustrates the pre-solubilization of ESO Example 6 in water in combination with a boric acid solution and di-propylene glycol. The pre-solubilized ESO is to be used later in the direct dispersion of zinc dust. Example 30 was prepared by the following method. The following ingredients were added under continuous agitation in a metallic beaker equipped with mechanical agitation and a Cowles blade: 3.3 weight percent of ESO Example 6 and 1.65 weight percent of dipropylene glycol. 1.65 weight percent of a 0.1% solution of orthophosphoric acid solution in water was then added to the resulting mixture and mixed until a clear solution was obtained. Under continuous agitation, 4.4 weight percent of a 45 g/l solution of boric acid in demineralised water was added to the clear solution and was mixed for 16 hours until a clear solution was obtained. After acidic dissolution of the ESO, the pH of the clear solution was adjusted to about 6.0 with 2.2 weight percent of 1 g/l solution of caustic soda in water.

EXAMPLE 31

Dispersion of Metallic Powder into the Solution of Example 30

Example 31 illustrates the dispersion of metallic powder into the solution obtained in Example 30. Example 31 was prepared by the following method: under continuous agitation, 0.48 weight percent of APEO free surfactant (HLB 13-Berol® 48), 0.44 weight percent of APEO free surfactant (HLB 9-Lauroxal 3) and 0.22 weight percent of siloxane antifoam (Y-15702 available from GE Silicones) were added to the solution obtained in Example 30 and mixed for about 10 minutes. After mixing, the following metallic filler was added under continuous agitation: 80.8 weight percent of zinc dust (DP 16 zinc dust particles available from Umicore). During introduction of the metallic filler, the speed of the agitator was progressively increased in order to maintain appropriate dispersion torque. Dispersion was maintained for 1 hour at 1000 rpm. 7.0 weight percent of an epoxy dispersion (New Gen DPW 6870 available from Hexxion) was then added to the dispersion and stirred for 10 minutes at 500 rpm. Finally, 0.06 weight percent of Aerosil® 972 (available from Degussa Huls) was added into the dispersion and agitated for 10 minutes at 500 rpm. The final dispersion had a viscosity of 90 seconds DIN cup number 4 and pH of 6.9. This dispersion is to be used later on as the A part of a two pack epoxy dispersion of a waterborne shop primer.

The dispersion was kept at room temperature for more than 4 months without any signs of hydrogen degassing or strong settlement issues.

EXAMPLE 32

Preparation of a 2-Pack Waterborne Shop Primer A+B

Example 32 describes the preparation of a 2-pack waterborne shop primer using the dispersion of Example 31 (designated as Part A). Example 32 was prepared by the following method. Parts A and B, described and in the amounts listed in Table 14, were mixed together in metallic beaker under mild agitation for 20 minutes at 500 rpm. The mixture was then adjusted to 18 seconds DIN cup number 4 with demineralised water. There was a significant increase in viscosity of the waterborne shop primer after 24 hours. The characteristics of the waterborne shop primer of Example 32 are described below in Table 15.

TABLE 14

| Ingredients | Amount |
| --- | --- |
| Part A | |
| Example 31 | 100 Parts |
| Part B | |
| New Gen DPW 6870 (amine catalysts available from Hexxion) | 3.5 parts |
| Accelerator Epikure 3253 (available from Hexxion) | 0.13 parts |

TABLE 15

Waterborne Shop Primer Characteristics of Example 32

| | Part A | Part B | Part A + B |
| --- | --- | --- | --- |
| VOC content (g/l) | 80 | 35 | 81 |
| Dry content (%) | 88.5 | 54 | 87.3 |
| Zinc content (%) | 80.8 | 0 | 77 |
| Organic polymer content (%) | 4.6 | 54.6 | 6.3 |

EXAMPLES 33-37

Application of Waterborne Shop Primer of Example 32 on CRS Panels

Examples 33-37 illustrate the application of the waterborne shop primer of Example 32 on CRS panels and curing the panels under different curing conditions. Example 33-35 were prepared by spraying a uniform layer, having a thickness of from about 17 to about 20 microns, of the waterborne shop primer of Example 32 on CRS panels and curing the panels at ambient temperature for 24 hours. Examples 36-37 were prepared by spraying a uniform layer, having a thickness of about 25 to about 27, of the waterborne shop primer of Example 32 on CRS panels and curing the panels by air-drying at 70° C. in an oven for 5 minutes and then removing the panels from the oven and completing the cure at ambient temperature for 24 hours. The physical characteristics and curing conditions of Examples 33-37 are outlined in Table 16 below.

Once cured, the panels of Examples 33-37 were tested for the following characteristics: Dry to touch, time for no mark by contact; Tack free, time for no mark during handling; Dry through, time for coating to resistance scratch and rub; Adhesion, cross cut adhesion test; Impact resistance, reverse impact—falling ball 2 kg-100 cm; Water resistance (drain), time for resistance to drain water; Water resistance (immersion), time for resistance to immersion in water for 24 hours; MEK rub resistance; Scrubs resistance after 24 hours storage at ambient temperature; Salt spray resistance test; Corrosion propagation in creep; and red rust apparition in scratch. The results of the foregoing test of Examples 33-37 are illustrated in Table 17 and discussed below.

TABLE 16

Physical Characteristics and Curing Conditions of Examples 33-37

|  | Example 33 | Example 34 | Example 35 | Example 36 | Example 37 |
|---|---|---|---|---|---|
| Deposition (grams/sqm) | 14.3 | 14.9 | 18.5 | 11.3 | 11.5 |
| Thickness (microns) | 17 | 17 | 20 | 25 | 27 |
| Curing Conditions | Ambient | Ambient | Ambient | Air-Dried at 70° C. for 5 minutes and then ambient | Air-Dried at 70° C. for 5 minutes and then ambient |

TABLE 17

|  |  | Test Results | | | | |
|---|---|---|---|---|---|---|
|  |  | Example 33 | Example 34 | Example 35 | Example 36 | Example 37 |
| Coating Tests | Dust Free (Minutes) | 10 | 10 | 10 | 10 | 10 |
|  | Tack Free (Minutes) | 90 | 90 | 100 | 35 | 35 |
|  | Dry through (70° C.- 5 minutes) | 30 | 30 | 30 | 40 | 40 |
|  | MEK rub resistance | >30 | >30 | >60 | >50 | >50 |
|  | Adhesion on CRS panel | 5A | 5A | 5A | 5A | 5A |
|  | Water resistance Drain (Hours) | 1 | 1 | 1 | 1 | 1 |
|  | Water Resistance Immersion (Hours) | 20 | 20 | 20 | 12 | 12 |
|  | Impact Resistance Reverse | 2 Kg-50 cm | 2 Kg-50 cm | 2 Kg-50 cm | 2 Kg-100 cm | 2 Kg-100 cm |
| Corrosion Test | Salt Spray | NSS | NSS | — | NSS | NSS |
|  | Red Rust Apparition in Scratch | 48 | 48 | — | 48 | 48 |
|  | Creep > 2 mm | 216 | 216 | — | 552 | 552 |

Results show that the waterborne shop primer described above dries quickly and provides good adhesion on metal. Results also show that the waterborne shop primer described above is a fast drying coating with good adhesion on metal. Water resistances reached good levels after very short drying times at room temperature. Chemical resistance was also very good. Adhesion and mechanical resistance tests show that the waterborne shop primer exhibited easy and fast mechanical handling without degradation of coatings. The results also show that the waterborne shop primer using an epoxy silane oligomer as dispersing and stabilizing agent for a zinc dust provided excellent corrosion protection against propagation of rust in creep. The shelf stability of the waterborne shop primer part A was excellent and exceeded 4 months.

EXAMPLES 38-47

EXAMPLES 38-41

Application of Waterborne Shop Primer on CRS Panels

Examples 38-41 describe the application of the waterborne shop primer of Example 32 on CRS panels. Examples 38-39 and 40-41 were prepared in accordance with methods described above in Examples 33-34 and 36-37, respectively. The physical characteristics of the coatings is described in Table 17 below.

TABLE 17

Physical Characteristics and Curing Conditions of Examples 38-41

|  | Example 38 | Example 39 | Example 40 | Example 41 |
|---|---|---|---|---|
| Deposition (grams/sqm) | 18.5 | 14.1 | 12.0 | 11.6 |
| Thickness (microns) | 20 | 17 | 27 | 24 |
| Curing Conditions | Ambient | Ambient | Air-Dried at 70° C. for 5 minutes and then ambient | Air-Dried at 70° C. for 5 minutes and then ambient |

EXAMPLES 42-47

Application of Solvent Borne Base Coat

Examples 42-45 were prepared by spraying a solvent borne base coat on the primer coated panels of Examples 38-41, respectively. Examples 46-47 were prepared, as a control, by spraying the solvent borne base coat directly onto a CRS panel without a primer. The solvent borne base coat is a commercially available product from Sigma Kalon.

Examples 42-45 were prepared by spraying a uniform layer, having a thickness of from about 73 to about 95 microns dry, of solvent borne coating on the primer coated panels of Examples 38-41, respectively. Examples 46-47 were prepared by spraying a uniform layer, having a thickness of about 81 to about 116, of solvent borne coating on CRS panels without any primer. Each of the Examples 42-47 were cured for 7 days at ambient conditions. The physical characteristics and curing conditions of Examples 42-47 are outlined in Table 19 below.

After curing, the tests described above in Examples 33-37 were performed on each of the panels of Examples 42-47, which are illustrated in Table 20 below.

TABLE 19

Physical Characteristics and Curing Conditions of Examples 42-47

|  | Example 42 | Example 43 | Example 44 | Example 45 | Example 46 | Example 47 |
|---|---|---|---|---|---|---|
| Primer Coated Panel | Example 38 | Example 39 | Example 40 | Example 41 | — | — |
| Deposition (grams/sqm) | 3.05 | 2.19 | 2.35 | 2.35 | 2.83 | 3.55 |
| Thickness of solvent borne coating (microns) | 95 | 92 | 73 | 75 | 81 | 116 |
| Thickness of shop primer and solvent borne coating (microns) | 115 | 109 | 100 | 99 | 81 | 116 |
| Curing Conditions | 7 Days Ambient Conditions | 7 Days Ambient Conditions | 7 Days Ambient Conditions | 7 Days Ambient Conditions | 7 Days Ambient Conditions | 7 Days Ambient Conditions |

TABLE 20

Test Results of Examples 42-47

|  |  | Example 42 | Example 43 | Example 44 | Example 45 | Example 46 | Example 47 |
|---|---|---|---|---|---|---|---|
| Corrosion Test | Salt Spray | NSS | NSS | NSS | NSS | NSS | NSS |
|  | Red Rust Apparition in Scratch | 48 | 48 | 48 | 48 | 48 | 48 |
|  | Creep > 2 mm | 522 | 552 | 960 | 960 | 288 | 288 |

The durability depositing a solvent borne coating on top of a waterborne shop primer of the present invention significantly extended corrosion resistance of the CRS panels. In addition, the VOC content was around 80 g/l without loss in drying or curing efficiency.

While exemplary embodiments have been shown and described, it will be understood by those skilled in the art that various modifications and substitutions may be made thereto without departing from the spirit and scope of the invention. Accordingly, it is to be understood that the present invention has been described by way of illustrations and not limitation.

What is claimed is:

1. A waterborne composition which comprises:
   i) a water soluble epoxy silane oligomer composition containing from 7.46 to 23.5 weight percent residual monomer, wherein the epoxy silane oligomer is produced by the reaction of glycidoxy silane having 3 alkoxy groups with water, wherein the molar ratio of water to silane monomer is from 0.1 to 1.5, in the presence of a catalyst, wherein said water is continuously fed during the reaction and the by-product alcohol is continuously removed during the reaction;
   ii) at least one particulate metal selected from the group consisting of aluminum, manganese, cadmium, nickel, tin, magnesium, zinc, alloys thereof and ferroalloys thereof; and,
   iii) one or more optional ingredients selected from the group consisting of a surfactant, pH adjusting agent, co-solvent, monomeric silane, binder, crosslinker and pigment paste dispersion.

2. The waterborne composition of claim 1 wherein the epoxy silane oligomer composition is pre-solubilized in an aqueous solution.

3. The composition of claim 1 wherein optional pH adjusting agent is at least one member selected from the group consisting of boric acid, orthophosporic acid, acetic acid, ascorbic acid and citric acid; optional co-solvent is at least one member of the group consisting of dipropylene glycol methyl ether, ethylene glycol monomethyl ether, ethylene glycol monoethyl ether, ethylene glycol monopropyl ether, ethylene glycol monobutyl ether, ethylene glycol monomethyl ether acetate, ethylene glycol monohexyl ether, ethylene glycol mono-2-ethylhexyl ether, ethylene glycol monophenyl ether, diethylene glycol monomethyl ether, diethylene glycol monoethyl ether, diethylene glycol monopropyl ether, diethylene glycol monobutyl ether, butyl carbitol, dipropylene glycol dimethyl ether, butyl glycol, butyldiglycol, ethylene glycol monobutyl ether acetate, diethylene glycol monoethyl ether acetate, diethylene glycol monobutyl ether acetate, n-propyl acetate, n-butyl acetate, isobutyl acetate, methoxypropylacetate, butyl cellosolve acetate, butylcarbitol acetate, propylene glycol n-butyl ether acetate, t-butyl acetate, n-butanol, n-propanol, isopropanol and ethanol.

4. The composition of claim 1 wherein the surfactant is at least one member selected from the group consisting of alkyl-phenol-ethoxylate surfactant, cationic surfactant, anionic surfactant, non-ionic surfactant, a polyether siloxane-based surfactant and any combination thereof.

5. The composition of claim 1 wherein the surfactant has a hydrophilic-lipophilic balance value of from about 5 to about 15.

6. The composition of claim 1 wherein the binder is selected from the group consisting organic or inorganic binders.

7. The composition of claim 6 wherein the inorganic binder is selected from the group consisting of silicates, ethyl silicates, silica nano particles solutions and silicone resins.

8. The composition of claim 6 wherein the organic binder is selected from the group consisting of non-ionic stabilized resins, anionic stabilized emulsions and cationic stabilized emulsions.

9. The composition of claim 8 wherein the organic binder is selected from the group consisting of vinylic resins, polyvinyl chlorides, vinyl chloride copolymers, vinylacetate copolymers, acrylics copolymers, styrene butadiene copolymers, acrylate copolymer, polyacrylate, styrene acrylate copolymers, phenolic resins, melamine resins, epoxy resins, polyurethane resins, alkyd resins, polyvinyl butyral resins, polyamides, polyamidoamines resins, polyvinyl ethers, polybutadienes, polyester resins, organosilicone resins, organopolysiloxane resins, nitrocellulosic resins, carboxymethyl cellulose, cellulose esters of organic acids, cellulose ethers, modified natural rubbers, natural gums, a solution of said polymers and copolymers, and any combination thereof.

10. The composition of claim 1 wherein the crosslinker is selected from the group consisting of isocyanates, epoxy curing agents, amino agents, aminoamido agents, epoxy amino adducts, carbodiimides, melamines anhydrides, polycarboxylic anhydrides, carboxylic acid resins, aziridines, titanates, organofunctional titanates and organofunctional silanes.

11. The composition of claim 10 wherein the organofunctional silane is selected from the group consisting of epoxy silanes, aminosilanes, isocyanatosilanes, methacryl silanes and vinylsilanes.

12. The composition of claim 1 wherein the pigment paste dispersion is selected from the group consisting of organic pigment dispersions and inorganic pigment dispersions.

13. The composition of claim 1 wherein the epoxy silane oligomer composition is present in the range of about 0.05 to about 40 weight percent of the composition.

14. The cured composition of claim 1.

15. An adhesive, sealant or coating composition which comprises the waterborne composition of claim 1.

16. The composition of claim 1 wherein the particulate metal is selected from the group consisting of zinc dust, zinc flake, aluminum dust, aluminum flake, zinc aluminum alloy dust, zinc aluminum alloy flakes and any combination thereof.

17. The composition of claim 1 wherein the particulate metal is in a powder or paste dispersion form.

18. A waterborne composition which comprises:
  i) an epoxy silane oligomer, composition containing from 15 to 23.5 weight percent residual monomer, wherein the epoxy silane oligomer is produced by the reaction of glycidoxy silane and/or cycloaliphatic epoxy silane having 3 alkoxy groups with water wherein the ratio of water to silane monomer is from 0.1 to 1.5 in the presence of a catalyst, wherein said water is continuously fed during the reaction and wherein the epoxy silane oligomer composition is pre- solubilized in an aqueous solution; and,
  ii) one or more optional ingredients selected from the group consisting of a surfactant, pH adjusting agent, co-solvent, monomeric silane, binder, crosslinker and pigment paste dispersion, and,
  iii) at least one particulate metal selected from the group consisting of zinc chromate, zinc potassium chromate, zinc phosphates, alumino triphosphates, calcium magnesium phosphates, barium phosphates, aluminum zinc phosphates, molybdates, wolframates, zirconates, vanadates, zinc salts of 5-nitrophthalic acid and iron phosphide.

19. A coating composition which comprises the composition of claim 18.

20. The cured product of claim 19.

* * * * *